United States Patent [19]

Rasmussen et al.

[11] Patent Number: 4,872,026

[45] Date of Patent: Oct. 3, 1989

[54] INK-JET PRINTER WITH PRINTHEAD CARRIAGE ALIGNMENT MECHANISM

[75] Inventors: Steve O. Rasmussen; Larry A. Jackson; John D. Rhodes, all of Vancouver; David W. Pinkernell, Pullman; J. Paul Harmon, Vancouver; Kevin L. Moon, Vancouver; William R. Huseby, Vancouver, all of Wash.

[73] Assignee: Hewlett-Packard Company, Palo Alto, Calif.

[21] Appl. No.: 149,454

[22] Filed: Jan. 28, 1988

Related U.S. Application Data

[63] Continuation-in-part of Ser. No. 24,278, Mar. 11, 1987, Pat. No. 4,728,963.

[51] Int. Cl.[4] .......................... G01D 15/16; B41J 3/04

[52] U.S. Cl. ................................ 346/140 R; 346/134; 400/126; 400/175

[58] Field of Search ................ 346/140, 134; 400/126, 400/624, 175

[56] References Cited

U.S. PATENT DOCUMENTS

| | | | |
|---|---|---|---|
| 4,567,494 | 1/1986 | Taylor | 346/140 |
| 4,630,077 | 12/1986 | Berruti | 346/140 |
| 4,698,650 | 10/1987 | Watanabe | 346/134 |
| 4,709,247 | 11/1987 | Piatt | 346/140 |
| 4,712,172 | 12/1987 | Kiyohara | 346/140 X |
| 4,728,963 | 3/1988 | Rasmussen | 346/134 X |
| 4,751,527 | 6/1988 | Oda | 346/140 |
| 4,755,836 | 7/1988 | Ta | 346/140 |
| 4,794,859 | 1/1989 | Huseby | 101/485 |

*Primary Examiner*—Joseph W. Hartary
*Attorney, Agent, or Firm*—S. A. Kassatly

[57] ABSTRACT

A novel ink-jet printer (10) is provided. The print provides both paper supply tray (12) and paper collection tray (18) in the front (14) of the printer for ease of paper handling and reduced footprint. The paper collection tray is provided with a pair of opposed output rails (22) which support a sheet of paper (**16*c*) during printing to permit ink on a sheet of paper (16b) previously printed to dry. A paper handling mechanism is provided which eliminates a sheet pickup motor and associated elements. The paper handling mechanism is configured to pick off a sheet of paper from a stack of input paper, bring it around paper drive rollers (24) onto a platen (26), where the printing operation, employing a printhead cartridge (32), occurs. The printer further includes a service station (230) for clearing clogged nozzles in the printhead (33) and removing bubbles therefrom, for covering the nozzles with a protective cap (266), and for wiping contaminants off the nozzles. Reference pads (200) are provided for aligning and securing the printing cartridge in a carriage (35). The carriage is associated with a carriage guide (27**), to which the carriage and print medium are referenced. The resulting printer is easy to manufacture, has reduced complexity by eliminating components in the paper drive mechanism and is lower in cost.

13 Claims, 19 Drawing Sheets

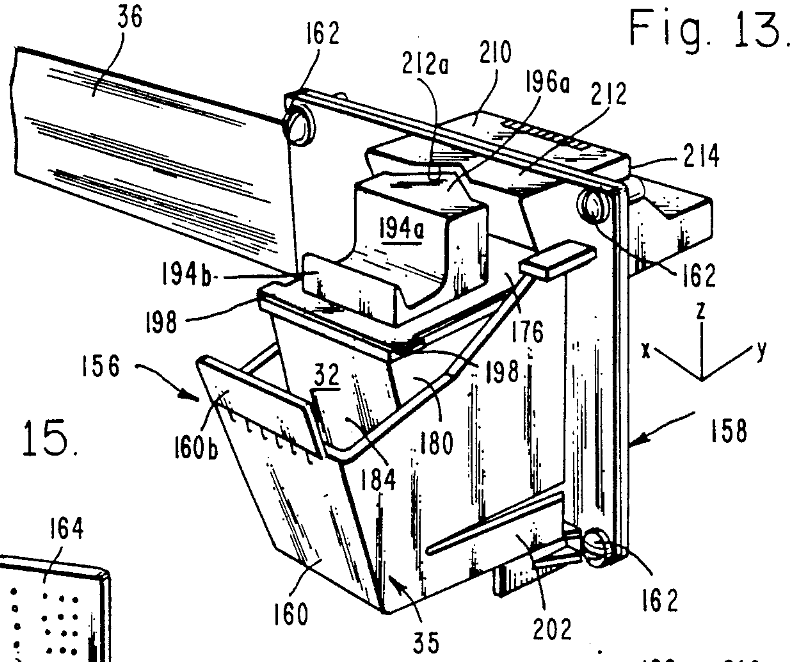
Fig. 13.
Fig. 15.
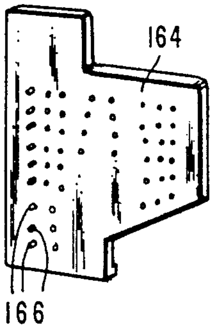
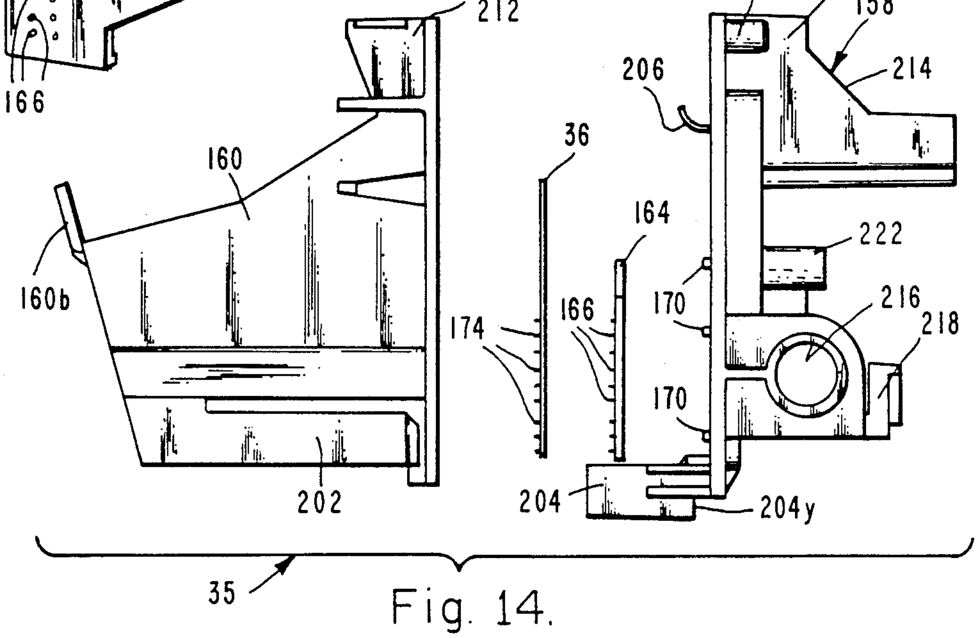
Fig. 14.

Fig. 16.
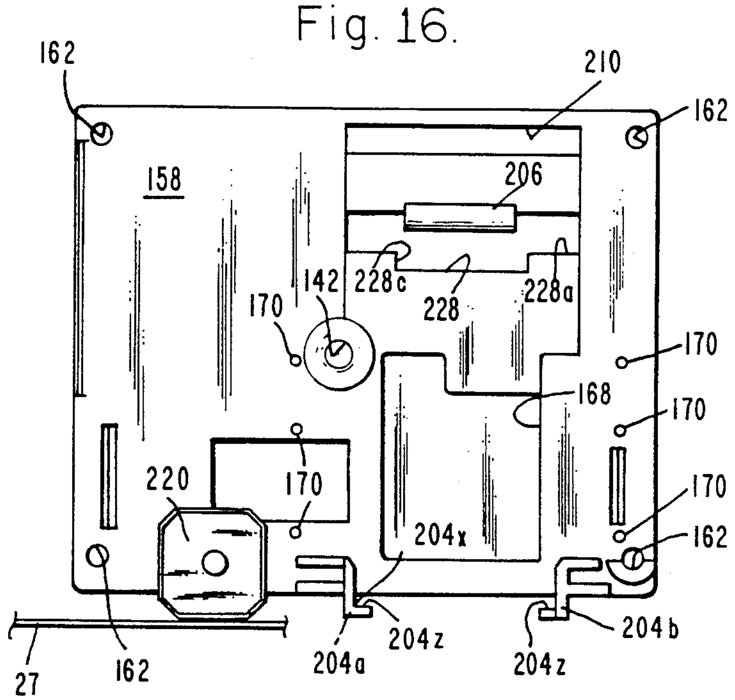
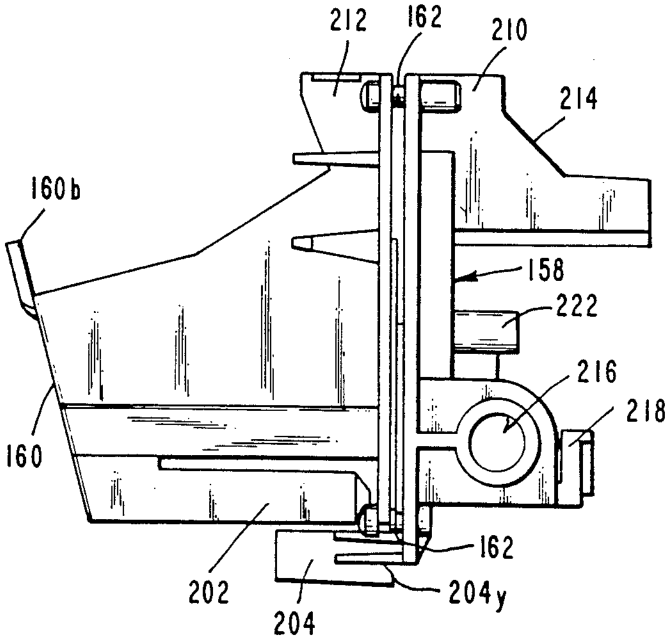
Fig. 17.

Fig. 23a.
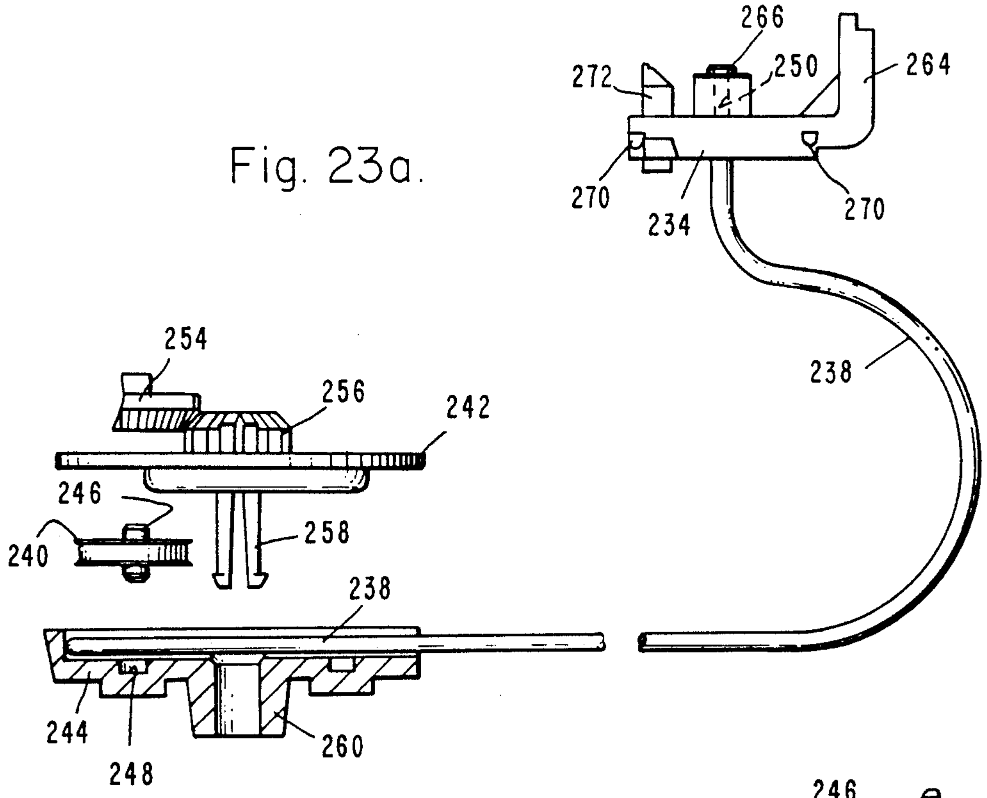
Fig. 23b.
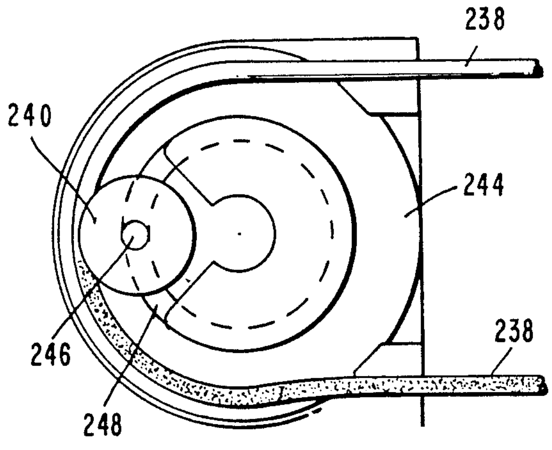
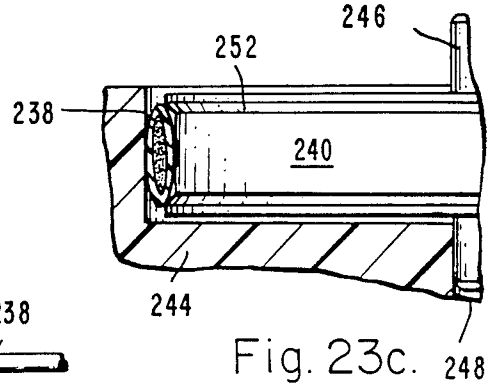
Fig. 23c.

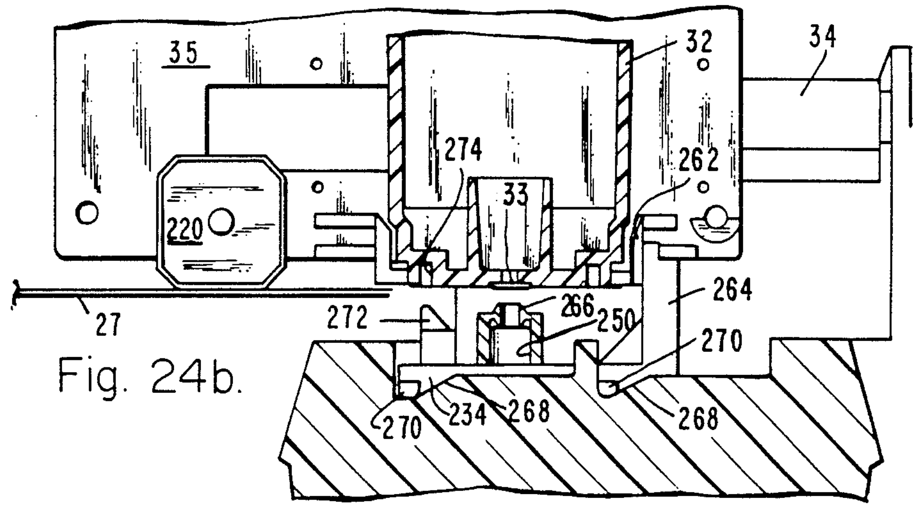
Fig. 24b.
Fig. 24c.
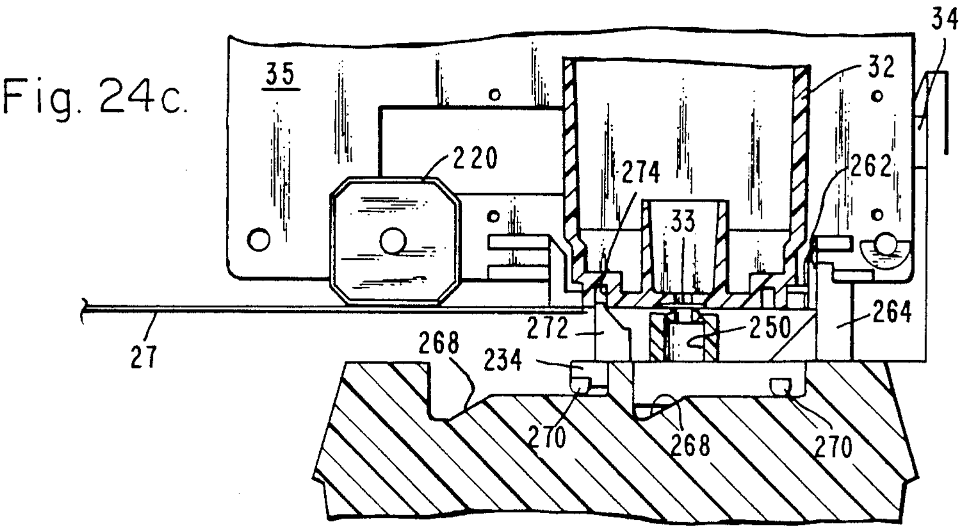
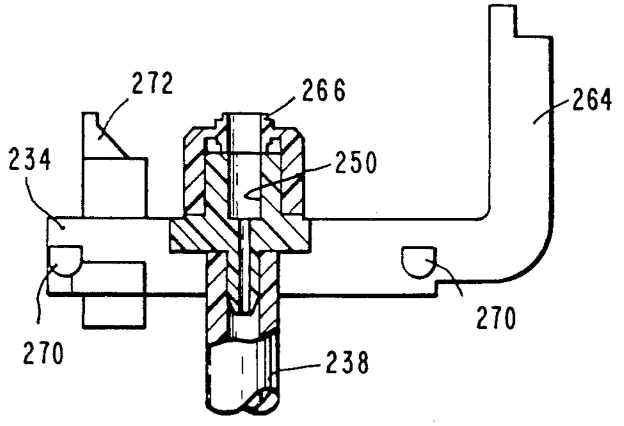
Fig. 24a.

INK-JET PRINTER WITH PRINTHEAD CARRIAGE ALIGNMENT MECHANISM

CROSS-REFERENCE TO RELATED APPLICATION

The present application is a continuation-in-part application of Ser. No. 07/024,278, filed Mar. 11, 1987 now U.S. Pat. No. 4,728,963.

TECHNICAL FIELD

The present invention relates generally to ink-jet printing, and, more particularly, to a thermal ink-jet printer having a user-facing sheet feed and return assembly with mechanical simplicity and ink drying capability superior to printers without additional drying mechanisms and less expensive than printers with such mechanisms. The printer disclosed and claimed herein is of the type in which printing is done in a substantially horizontal plane As a result, the print medium (i.e., paper) is taken from and deposited in substantially horizontal collection means. In addition, a printhead cartridge/carriage assembly and a service station for servicing the printhead are provided. A unique referencing of critical elements to each other ensures reproducible printing quality.

BACKGROUND ART

Hitherto in the art of ink-jet printing, a common technique for feeding paper or other media to a printhead head has involved the use of pick-off or feed rollers which are specifically dedicated to the transferring of paper from a paper tray to the area of the printer between the printhead and the paper support member (platen) adjacent thereto. In this latter area, there is required an additional paper drive mechanism used to continue the transport of the paper past the printhead and printing zone and onto a paper collection tray or the like. Indeed, often a third drive is used with respect to transporting the paper to the paper collection tray.

Thus, the printer drive assembly requires a first drive mechanism for transporting paper out of the paper supply tray and a second paper drive mechanism for transporting paper past the printhead and into the paper collection tray. The requirement of multiple paper drive mechanisms adds to the cost and complexity of the ink-jet printer.

In addition, such prior ink-jet printers must deal with the problem of ink drying, unless specially coated paper is employed. If no mechanism is provided for drying the ink, then, with the rapid output of paper, one sheet is placed in the paper output tray before the ink on the sheet underneath has had an opportunity to dry, thereby causing smearing of the print on the lower sheet. One common mechanism is to provide some sort of drying means, such as a lamp or heater. However, such a requirement also adds to the complexity of the printer, since a power source, lamp or other heating device, and associated apparatus must be provided. Such apparatus also adds to the weight of the ink-jet printer.

It is thus desired to reduce the cost and complexity of the printer, while simplifying the components and their interactive association. It is also desired to provide means for handling printed media in a manner that prevents smearing of previously-printed sheets of the print medium.

Ink-jet printers comprise a plurality of interrelated components for printing on a print medium, such as paper. For example, the print zone of the paper is supported on a platen, and a print cartridge, secured in a bidirectionally movable carriage, prints characters on the paper in the print zone through a printhead in the cartridge.

There are several aspects of the printing that must be controlled to achieve consistency in printing from one sheet to the next and from one sheet thickness to another. For example, the printhead-to-paper space must be controlled, as must the printhead-to-paper angle.

The carriage moves on a shaft substantially parallel to the print zone, and the degree of parallelism must be controlled in order to assure uniformity of print across the sheet of paper. Further, the print medium is moved through the print zone by means of a drive roller mounted on a drive shaft. This drive shaft should also be maintained parallel to the print zone. Finally, the printer must be able to maintain the paper flat against the platen and deal with cockling of the paper, which occurs due to the presence of wet ink. Cockling tends to cause the gap between the paper and the printhead to vary.

In ink-jet printing technology, a printhead, comprising a plurality of nozzles in a nozzle plate, is fluidically associated with a reservoir of ink. The printhead is mounted on one end of a print cartridge and the reservoir is provided inside the cartridge.

An interconnect means is provided, which carries electrical signals from a microprocessor in the printer to the printhead. For thermal ink-jet printers, these signals provide a current to resistors associated with the nozzles and thus control the heating of specific resistors, which in turn form droplets of ink. The droplets of ink are expelled through the nozzles toward a print medium, such as paper. The particular pattern of resistor heating controls the pattern of characters formed on the print medium.

The print cartridge is supported in a carriage, which is adapted to move bidirectionally, perpendicular to the movement of the print medium through the printer. The carriage movement is controlled by a motor and an associated belt drive, with the motor controlled by the microprocessor.

Insertion of an ink-jet cartridge into the carriage often necessitates use of two hands. Further, many cartridge/carriage configurations do not provide simultaneous alignment of the nozzle plate in the X, Y, and Z directions. Finally, contact between the printhead and the interconnect means must be reliably made, in order to ensure proper nozzle firing.

Accordingly, it is desired to provide a cartridge/carriage assembly that includes the foregoing advantages without the limitations of the prior art.

Service stations in ink-jet printers are intended to maintain a thermal ink-jet printhead in good working order for the service life of the printhead. As is well-known to those skilled in this art, the printhead is formed as part of a printing cartridge. The cartridge contains a reservoir of ink, and the printhead contains an assembly of passageways, firing elements (resistors) and nozzles for firing droplets of ink toward a printing medium, such as paper.

During the course of operation, it is possible for nozzles to become clogged with ink and for bubbles of air to be trapped in such a manner as to interfere with the correct operation of the printhead. Also, it is desired to prevent contaminants, such as paper dust, from affecting the operation of the nozzles and to prevent ink from drying in the nozzles when the printhead is at rest. Finally, it is desired to clear out soft viscous plugs of ink, which may form while the printhead is at rest. This should be done prior to initiation of printing, to ensure that all nozzles in the orifice plate of the printhead are firing properly.

A service station can address the afore-mentioned problems and requirements. While service stations are not per se novel in thermal ink-jet printing, it is a goal to provide a service station with easy operation which maximizes a number of functions in a minimum of space. The preferred service station has a number of functions, including:

1. clear clogged nozzles and remove bubbles;
2. cover nozzles when the printhead is not in use to prevent contamination thereof;
3. prevent ink from drying out in the nozzles when the printhead is not in use;
4. wipe contaminants picked up during printing off of nozzles; and
5. provide a location to fire nozzles into for clearing out the soft viscous plugs of ink.

DISCLOSURE OF INVENTION

In accordance with the invention, an ink-jet printer is provided. The ink-jet printer comprises in associative combination:

(a) a paper supply means for providing a supply of a medium to be printed;
(b) a paper collection means for collecting printed medium;
(c) means for conveying a sheet of the medium from the paper supply means to the paper collection means through a printing zone;
(d) a cartridge provided with a printhead and mounted on a carriage cooperatively associated with a carriage guide and adapted to move orthogonal to movement of the medium supported on a platen maintained in the printing zone;
(e) means for creating a reverse bow in the sheet of the medium for directing the sheet in a plane parallel to the printing zone just prior to entering the printing zone for maintaining flatness of the sheet;
(f) means for referencing the carriage and the print medium to the carriage guide;
(g) means for permitting ink on a previously-printed sheet of the medium to dry during printing of the next sheet of the medium and for conveying the printed sheet to the paper collection means; and
(h) means for controlling the medium-conveying and the printing operations.

The conveying means comprises an active paper drop mechanism having a pair of opposed, spaced-apart side rail members associated with the paper collecting means. Each side rail member is cooperatively associated with one side of the print medium and is provided with:

(i) means for moving the member from an initial closed, sheet-supporting position to an open position, wherein the sheet is no longer supported; and
(ii) means for returning the member to the initial position.

The printhead cartridge and carriage form an assembly which includes means for securing the cartridge in position in the carriage and referencing means for aligning the cartridge in the carriage. The ink-jet printer of the invention also includes interconnect means for supplying electrical signals to the cartridge from the controlling means, such as a microprocessor, and the cartridge includes means for conveying the electrical signals to the printhead thereon.

The cartridge has top, bottom, sides, front and rear surfaces; the printhead is mounted on the bottom surface. A contact is provided on the back surface to convey the electrical signals from the interconnect means to the printhead. Referencing pads are provided on the side surfaces A lip is provided on the back surface for accepting a snap spring for locking the cartridge in position in the carriage The securing means includes the snap spring and means for receiving the referencing pads on the cartridge. The force loading means urge the interconnect means against the contact of the cartridge.

The printhead cartridge/carriage assembly of the invention requires only one hand of the operator to both insert and lock the cartridge in position. Further, the cartridge/carriage assembly provides simultaneous alignment of the nozzle plate in the X, Y, and Z directions. Finally, contact between the printhead and the interconnect means is reliably made each time the cartridge is inserted and locked in position, thereby ensuring proper nozzle firing each time.

A service station is also provided for the printhead. The service station comprises:

(a) means for priming the printhead,
(b) means for actuating the service station by the carriage;
(c) means for sealing the printhead during non-printing operations, and
(d) means for cleaning the printhead.

Use of a fixed cleaning means, such as a wiper, reduces the number of parts otherwise required to clean the printhead. Use of an actuating means, such as a sled, eliminates solenoids. The sled, being self-actuating, requires no external control, other than through the action of the carriage motor which controls the motion of the carriage supporting the cartridge. Use of a ramp in conjunction with the sled permits positive sealing of the printhead with a cap and eliminates sliding of the cap across the orifice plate of the printhead.

The reverse bow is a change in direction of the sheet when the sheet comes off a drive roller and slides along the platen. This change in direction is caused by positioning the platen at an angle different than the tangent of the paper drive roller in the print zone. The reverse bow, which is in the transverse axis of the paper (parallel to the direction of printing), forces the paper flat against the platen by using the paper's own stiffness. Since the platen and the direction of printhead travel are substantially parallel and the paper is held flat against the platen by the reverse bow, constant printhead-to-paper spacing is maintained. By angling the printhead slightly with respect to the plane of the print zone, the cockling of the paper does not touch the printhead and smear the wet ink.

In one embodiment, the output support rails may be configured to support a sheet of print medium thereon during printing. At the termination of printing, the platen pivots downwardly and the sheet drops of its own weight into the output collection means.

In an alternative embodiment, an active paper drop mechanism is provided. The mechanism comprises a pair of opposed, movable rail members. Each side rail member is cooperatively associated with one side of the print medium and is provided with (a) means for moving from an initial, closed, sheet-supporting position to a spacing such that the sheet is no longer supported and (b) means for returning the member to the initial position.

The rails are provided with a wing member and are pivotally secured in the floor of the output collection means with the pivot point spaced inwardly from the wing member. Downward pressure against the wing member thus causes the rail to rotate outward from its closed position, into a recess provided in the side of the output tray. This provides sufficient clearance for the sheet to drop into the output stack. Upon release of the downward pressure, the spring means causes the rail member to return to its original closed position.

In one embodiment, a platen support member, which is associated with the platen upon which the sheet of print medium is supported during the print operation, rotates downwardly after printing that sheet. The platen support member is provided with an ear member that engages the wing member during its downward travel, thereby forcing the rail members into the open position.

In the closed, or extended, position, the rail members provide support for a sheet of print medium. In the open position, the sheet of print medium drops of its own weight into the output collection means, by which time, a previously-printed sheet of the print medium has air-dried. By supporting the sheet from underneath, no paper-handling mechanism contacts the freshly-printed upper side of the sheet, also avoiding smearing of the ink.

A mechanically-actuated multiplexer is provided (1) for initiating the conveying of the sheet from the paper supply tray to the print zone, (2) for pivoting the platen downward at the end of printing each sheet, and (3) for activating a pump to prime the printhead. The multiplexer includes a plurality of parallel multiplexer gears, each associated with one of the foregoing functions. Actuation of one such gear is accomplished by use of a trigger mechanism. The trigger is pressed upwardly by a follower through an appropriately-positioned interposer arm supported by the printhead carriage. Positioning of the interposer arm is provided by the control means.

The print medium and the carriage are both referenced on the same part (a carriage guide). In this configuration, the print medium is urged against the underside of the carriage guide off of drive rollers, through the reverse bow in the print zone, and onto the platen, where it is printed. The carriage is referenced to the carriage guide through a slider bump by means of a carriage shaft and gravity.

The carriage guide comprises stiff thin sheet metal (e.g., 0.032 inch), which is closely-toleranced and has well-controlled dimensions. Thus, this part is good to reference to, rather than molded-in parts, which are not stiff enough at the required thickness. Straightness is also difficult to achieve at the required thickness with plastic parts.

The platen is allowed to move approximately perpendicular to the plane of the paper by means of spring loading to accommodate thicker print media.

Further, the platen is maintained a minimum fixed distance from the carriage guide to ensure that the paper is not pinched between the carriage guide and the platen. This reduces drag forces such that skew is minimized and paper drive forces are reduced. The lower drag forces eliminate the need for a reduced print zone, which is to provide a contact area for moving the paper, as the paper can be pushed into the print zone.

The resulting ink-jet printer is easy to manufacture, has reduced complexity by eliminating components in the paper drive mechanism and by providing a novel paper drying apparatus, and is lower in cost.

BRIEF DESCRIPTION OF THE DRAWINGS

FIG. 13 is a perspective view of an assembled carriage/cartridge assembly, together with electrical interconnect, thereto;

FIG. 14 is an exploded side elevational view showing the assembly of the electrical interconnect and an elastomeric support in the cartridge;

FIG. 15 is a perspective view, partly cut-away, of the elastomeric, support;

FIG. 16 is a front elevational view of the carriage;

FIG. 17 is a side elevational view of the carriage, without the cartridge;

FIG. 23a is a front elevational view, partly exploded, of a peristaltic pump used in the service station;

FIG. 23b is a top plan view of a portion of the peristaltic pump of FIG. 23a;

FIG. 23c is a detail of a portion of the roller used in the peristaltic pump;

FIG. 24a is a front elevational view, partly in section, of a portion of the sled subassembly of the service station of the invention;

FIG. 24b is a front elevational view, partly in section, of the sled just after engagement thereof by the carriage and prior to capping of the printhead;

FIG. 24c is a view similar to that of FIG. 24b, but of the sled and carriage subsequent to capping of the printhead.

FIG. 25c is cross-sectional view taken along the line 25c—25c of FIG. 25a;

BEST MODES FOR CARRYING OUT THE INVENTION

Figure 1:
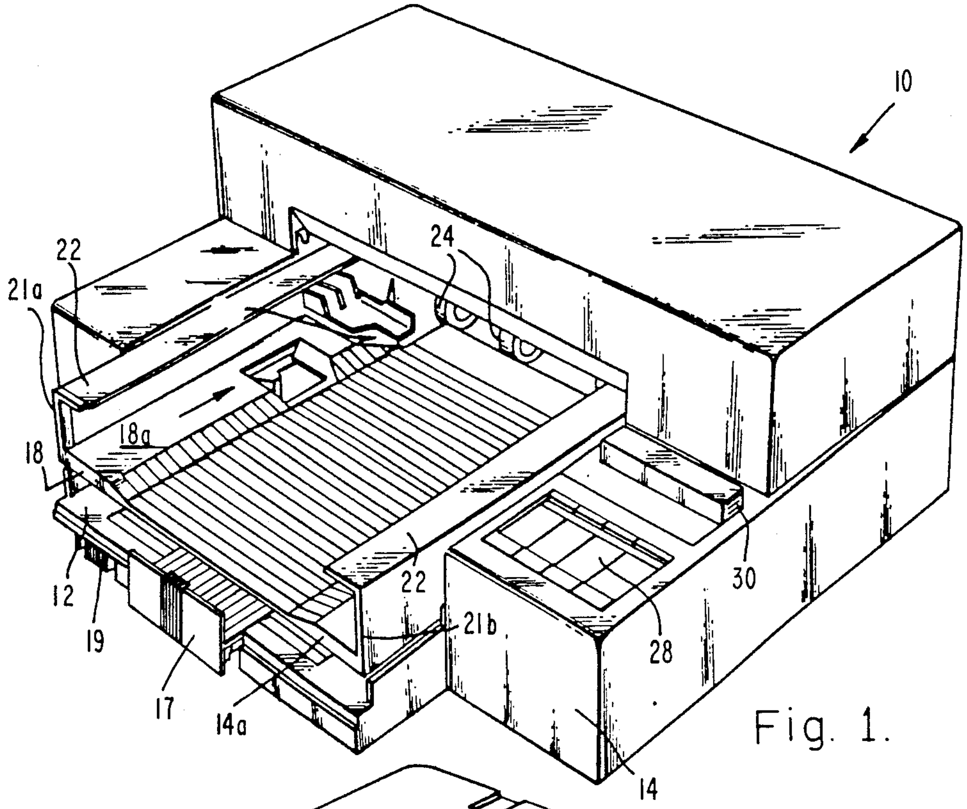
FIG. 1 is a perspective view of the novel ink-jet printer of the invention.

Referring now to the drawings wherein like numerals of reference designate like elements throughout, an ink-jet printer is depicted generally at 10. The novel ink-jet printer is characterized by several features unique to ink-jet printing and in particular to thermal ink-jet printing.

Figure 2:
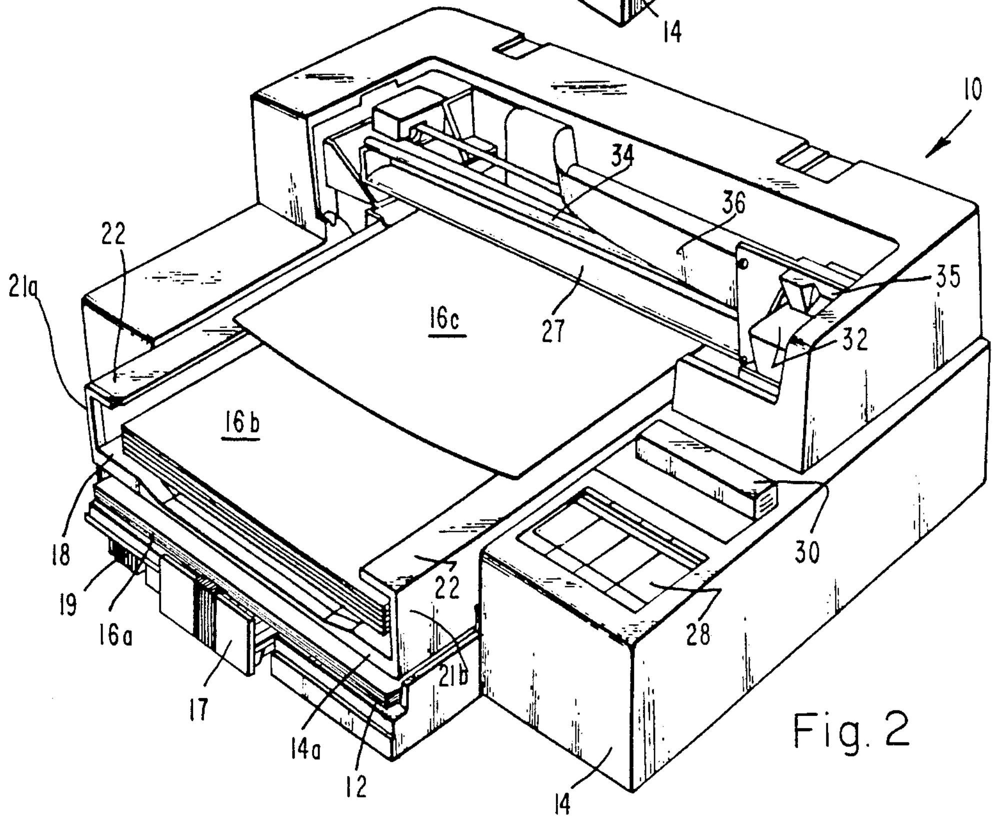
FIG. 2 is a view similar to that of FIG. 1, except that the top cover is removed, and a sheet of paper is shown during the printing operation prior to its deposit in the paper collection tray.

The first unique feature is seen in FIGS. 1 and 2.

Applicants will hereinafter make reference to the subject matter disclosed in the U.S. Pat. Nos. 4,728,963 issued on Mar. 1, 1988 Rasmussen et al.; and in the 4,794,895 issued on Jan. 3, 1989 to Huseby et al., both patents being assigned to a common assignee Hewlett-Packard Company. Applicant will further make reference to the subject matters of the U.S. patent applications Ser. Nos. 113,044 and 113,035, both filed on Oct. 23, 1987.There, it will be observed that a paper input or supply tray 12 is provided in the front, or user-facing portion, 14 of the printer 10. The paper input tray 12 is configured to handle a substantial quantity of paper 16a or other medium for printing thereon. A paper catch 17, which is slidably engaged in the floor of the input tray 12, adjusts to accommodate various lengths of print medium 16a and prevents the print medium from backing out. The front end of the paper catch 17 includes a stack height gauge to limit the height of the print medium 16a. Also, varying 16a may be accommodated by a laterally moving lever 19 mounted beneath the floor member 12 and provided with means (not shown) for urging against one side of the print media.

Also in the front 14 of the printer 10 is provided a paper output or collection tray 18. The paper output tray 18 is also configured to handle a substantial quantity of paper 16b.

The ink-jet printer 10 is of the type which prints a print medium 16b in the substantially horizontal plane, as compared with more common printers which print in the vertical plane. Printing in the horizontal plane entails stacking the print medium 16c in the horizontal output collection means or tray 18.

There are two features to be noticed with regard to the paper output tray 18. First, a ramped slot 20 is provided near the rear of the paper output tray 18, sloping downward from the top of paper tray floor rails 18a. This slot permits the introduction of envelopes. Single sheets are simply placed on top of the input stack 16a and the last sheet placed on the stack is the next sheet picked up.

Second, a pair of opposed output rails 22 is provided above the output tray 18. The pair of opposed rails is provided on top of a pair of vertical wall members 21a,b, which are separated by a floor member 23, upon which the printed medium 16b is stacked when printed. In one embodiment, these output rails 22 along with the platen 26 (visible in FIGS. 3c and 3d) support a sheet of paper 16c during the printing operation to permit the ink on the sheet 16b underneath to dry. At the end of the printing cycle, when the sheet 16c is near the front 14a of the paper Output tray 18, the platen 26 pivots down, eliminating the clamping of the sheet between the platen and carriage guide 27. The sheet 16c then drops into the paper output tray of its own weight. Up until the completion of the printing cycle, the rear end of the paper is supported by the paper drive rollers 24 and the platen 26 (shown in greater detail in FIG. 9 and discussed further below).

The front portion 14 of the printer 10 is also provided with a control panel 28, which is electrically associated with a microprocessor 29 for selection of various options relating to the printing operation. Such control operations, provided by presently-available microprocessors, are well-known in the prior art and form no part of this invention.

Similarly, a provision is made for insertion of one or more print format cartridges 30. Such print format cartridges permit the operator to select one or more print styles or fonts in order to customize the printed output.

Such print style selection is well-known and forms no part of this invention.

Also shown in FIG. 2 is a carriage 35, which travels on a carriage rod 34 and carriage guide 27, and a print cartridge 32 which is connected by a flexible electrical interconnect strip 36 to the microprocessor 29. The microprocessor 29 controls carriage motor 37, which provides movement of the carriage 35. The cartridge 32 is specifically designed for this ink-jet printer, and utilizes a thermal ink-jet printhead 33. However, the printer could operate with other ink-jet printheads if the carriage interfaces are compatible, or with other carriage configurations. Further, reconfiguration of the cartridge 32 would permit the use of other ink-jet technologies, such as piezoelectric. Such reconfiguration is within the capabilities of one skilled in the art.

FIG. *3a* depicts a gear train 38 used to transport paper *16a* from the paper input tray 12 to the paper output tray 18. The gear train 38 is controlled by a paper drive motor 40 (shown in FIG. 9) through a paper drive shaft 42. On the paper drive shaft 42 are mounted the drive rollers 24.

Figure 4:
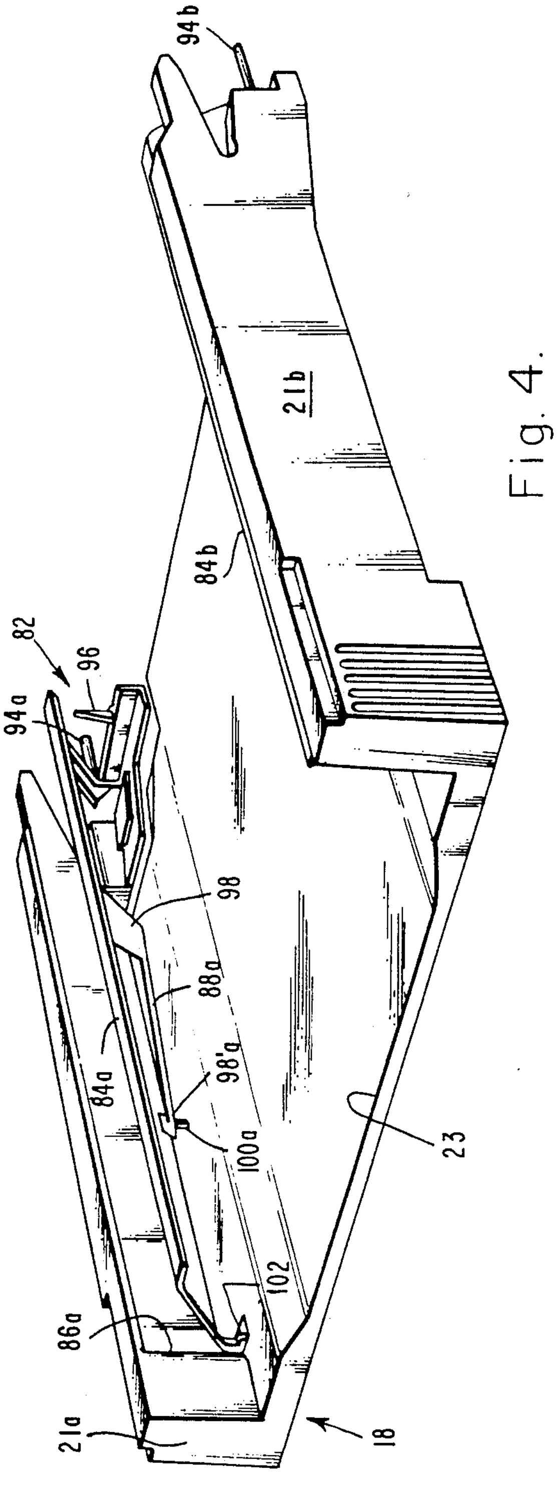
FIG. 4 is a cross-sectional view of a print medium output tray, with the rail members in the closed position, supporting a sheet of the print medium.

The gear train 38 comprises ten gears 44–62 which are arranged in such a fashion as to transfer rotary motion of the paper drive shaft 42 from gear 44 thereon to a cam 64 associated with cam gear 62. The respective motions are shown in FIG. *3a*; however, for simplicity, the gear train 38 is not shown in FIGS. *3b–d*. The arrangement of gears 44–62 is depicted in FIG. 4. The operation of the gear train is initiated by engaging a mechanical multiplexer 63, the operation of which is described in greater detail below.

The gear train 38 rotates the cam 64, which, to a first approximation, has a flat portion 66. Specifically, the cam 64 has an approximate kidney bean shape to allow the function of bringing the paper into position for picking a sheet 16c thereof and returning the paper to an initial position.

To accomplish this motion, the paper input tray 12 comprises two separate portions, a paper support 12a and a pressure plate 12b, disposed behind the paper support and generally in the same plane. The pressure plate 12b is spring-loaded with a spring 68, such as a pair of coil springs or leaf spring. When contacted by the full diameter of the cam 64, the pressure plate 12b of the paper input tray 12 is maintained in the horizontal position and in the same plane as the paper support 12a, as shown in FIG. *3a*.

As the cam 64 rotates and the flat portion 66 comes in contact with the top surface of the pressure plate 12b, the spring 68 forces the pressure plate upward, rotating about a fixed axial pivot 69, thereby permitting the rear edge 70 of the paper 16a to be contacted by the paper drive rollers 24, as shown in FIG. *3b*.

A single sheet of the paper 16c is picked off from the stack of paper 16a and is fed between the paper drive rollers 24 and first pinch wheels 72 associated therewith. Corner separators (not shown), conventional in the art of single sheet feeding, are advantageously employed in permitting a single sheet of paper to be The sheet of paper 16c continues around the drive rollers 24, between carriage guide 27 and a second set of pinch wheels 76, onto the platen 26, where printing of the sheet 16c is done (the printing zone).

The transition from the guide 27 to the platen 26 results in a reverse bow of the sheet 16c at point A (FIGS. *3c*, 26, 29). This reverse bow at A causes the sheet 16c to lie flat along the platen 26 in the region that the printhead 33 passes over (the print zone B), thereby maintaining a constant and closely controlled gap between the printhead and the paper, which is required for ink-jet technology.

The reverse bow is a change in direction of the paper when the paper comes off the drive roller 24 and slides along the platen 26. This change in direction is caused by positioning the platen 26 at an angle different than the tangent of the paper drive roller 24 at point A.

The reverse bow also causes the sheet 16c to bend transversely, thus preventing sheet bending longitudinally, which would otherwise allow it to fall between the output rails 22.

If the gap between the printhead 33 and the sheet 16c is too small, the printhead will smear the print, while if the gap is too large, poor print quality will result. The gap limitations depend on the particular printhead employed. For many printheads, the gap is likely to be in the range of about 0.030 to 0.050 inch.

The gap between the printhead 33 (shown in FIG. 29) and the sheet 16c is kept constant over a range of media thickness, and preferably does not exceed about 0.030 inches for the printer 10 disclosed herein. Use of a deformable support for the platen 26 to make it somewhat compliant permits slight deflection thereof to accommodate thicker paper and to maintain the desired narrow gap.

It will be appreciated that the shape of the cam 64 is selected to permit a sheet of paper 16c to enter into the guide-roller assembly. The condition must be met such that paper is picked properly and fed through the first set of pinch wheels 72 before the pressure plate 12b starts down. The paper stack size variable must be taken into account so that under all conditions, the above condition is met. The length of the paper is immaterial, since the cam 64 rotates through one complete revolution each time it is actuated by the mechanical multiplexer 63.

PASSIVE PAPER DROP

The sheet 16c being printed rides along the top of the output rails 22 until printing is completed. It will be appreciated that the width of the output rails 22 is sufficient to support the sheet of paper 16c during printing, but insufficient to support the sheet upon removal of the support provided by the platen 26. The width of the output rails 22 is selected to permit overlap thereof by a sheet 16c in the range of about ⅛ to ⅜ inch on each rail.

At the completion of printing, the platen 26 pivots downward, as shown in FIG. *3d*. The pivoting of the platen 26 is controlled through a second gear train 80. As with the cam 64, this gear train 80 completes one cycle each time it is actuated by the mechanical multiplexer 63.

The loss of support and reverse bow at the rear of the sheet of paper 16c is enough to cause the sheet of paper to fall of its own weight into the paper output tray 18, where it comprises output pap During the time of printing, the ink on the sheet of paper 16b previously printed has been drying, and by the time the next printed sheet 16c falls of its own weight, the lower sheet has completely dried, thereby avoiding smearing of the ink thereon. Thus, it will be appreciated that no drying mechanism, with its associated parts and power requirements, is required in order to dry the ink of a just-printed sheet of paper.

Active Paper Drop

Figure 5:
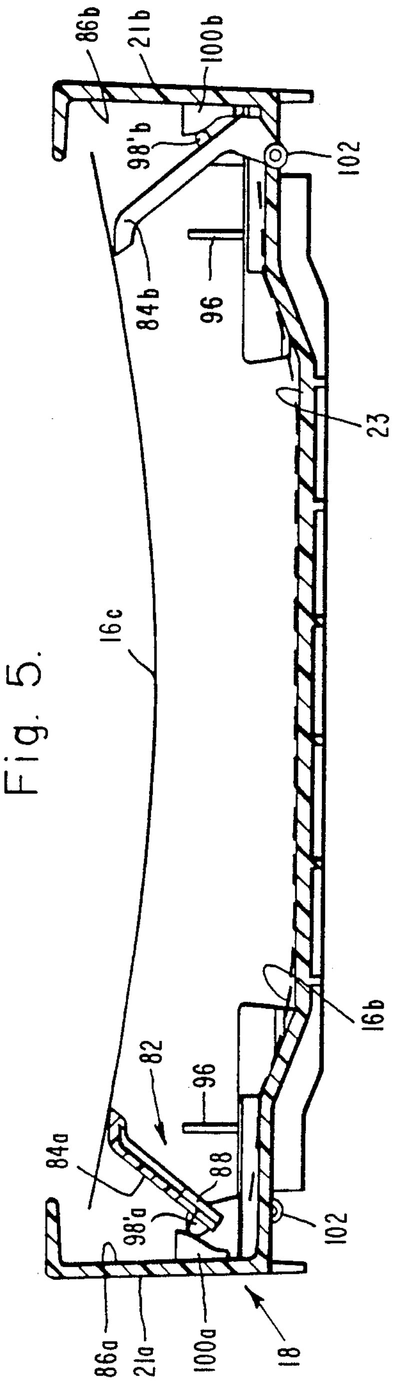
FIG. 5 is a perspective view, showing the print medium output tray and the rail members in the closed position.

An active paper drop mechanism, denoted generally at 82 in FIGS. 4–5, is alternatively provided for handling print media 16, such as paper, during printing and stacking the paper after it has been printed on. In a particular embodiment, as a sheet of paper 16c is being printed on, it must not touch any previously printed-on sheets 16b. The active paper drop mechanism permits the ink to dry on the sheets 16b that have previously been printed on and stacked.

As the current sheet of print medium 16c, e.g., paper, is printed on, it is fed into position for ejection over the already printed-on sheets 16b in the output tray 18. The active paper drop mechanism 82 comprises a pair of opposed, spaced-apart side rail members 84a,b, which, in a closed position, support the current sheet 16c and keep it elevated above the output stack 16b. Each side rail member 84a,b is thus cooperatively associated with one side of the print medium, along an edge thereof.

To eject the sheet 16c, the side rail members 84a,b are moved out of the way, such as by pivoting, to an open position, and the sheet drops onto the output stack.

The side rail members 84a,b are adapted to fit into recesses 86a,b provided in the vertical wall members 21a,b. When the side rail members 84a,b are in the recesses, the rail members are considered to be in the open position. A means 88a,b of returning the side rail members 84a,b to the initial, closed position is provided.

Thus, only an opening motion needs to be provided. Such opening motion may be supplied by a pivoting platen support 90, shown in FIGS. 6, 8*a–b*, which is associated with the platen 26. The platen 26 supports the sheet 16c, particularly in the print zone, denoted B in FIG. 26, during printing. On each end of the pivoting platen support 90 is an ear 92, each of which engages a wing 94a,b of the side rails 84a,b to force the rails into the open position.

At the termination of printing of the sheet 16c, at which time the bottom edge of the sheet is still supported by the platen 26, the platen support 90 and the platen both pivot downwardly to remove support from beneath the bottom edge of the sheet.

Snouts 96 prevent the sheet 16b from feeding back under the platen. The snouts 96 are formed as a part of the floor 23 of the output tray 18.

The return means may comprise a return spring 88a,b, built onto each side rail member 84a,b, which tends to push the rail member back into the closed position.

The spring motion may be achieved by a variety of ways, such as with coil or leaf springs and the like. In a preferred embodiment, each side rail member 84 is provided with a downwardly depending, L-shaped peninsular, or cantilevered, member 98, which is fabricated as an integral piece with the side rail member and is provided with an outward bow, which causes some preloading force in the closed position. The free end 98, of the cantilevered member 98 bears against a stud member 100 at all times. The stud member 100 is formed as an integral part of the inner wall of the vertical wall 21.

In the open position, the cantilevered member 98 assumes a nearly straight (deflected) configuration, but, desiring to return to the bowed (undeflected) configuration, exerts pressure against the stud member 100 to urge each side rail member 84 to return to the closed position. Such return, however, is prevented so long as the ear 92 is in contact with the wing member 94. On the other hand, once such contact is released, the side rail members 84a,b return to their closed position.

The side rail members 84a,b are pivotally secured at each end thereof in the floor 23 of the output tray 18. The side rail members rotate about a pivot point 102, which is spaced inwardly from the Wing member 94.

Figure 6:
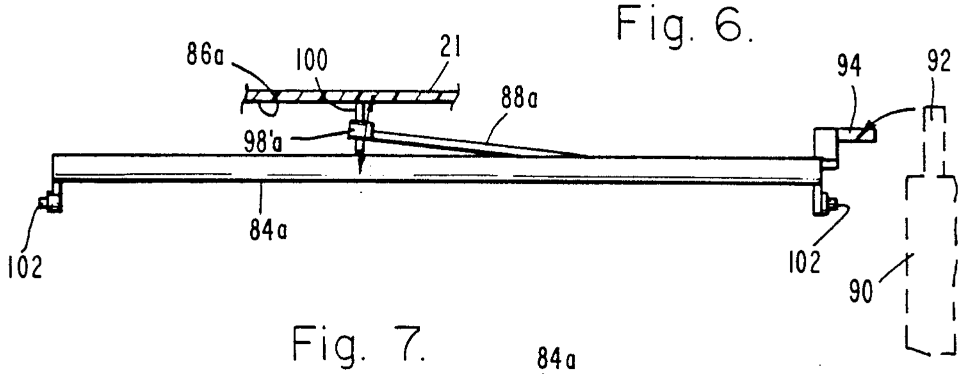
FIG. 6 is a top plan view, illustrating the motion of a rail member upon activation.
Figure 7:
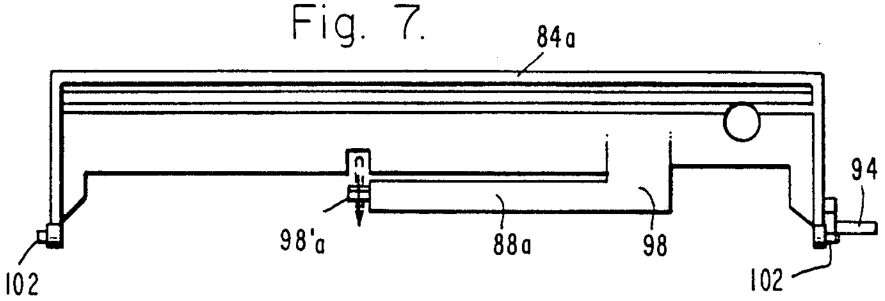
FIG. 7 is a side elevational view of the rail member.

As seen in FIG. 6, downward rotation of the platen support 90 and its associated ear member 92 into the plane of the drawing causes engagement of the wing member 94 on the side rail member 84. Such motion causes the wing member 94 to pivot about the pivot point 102, forcing the side rail member 84 into the recess 86. Thus, the side rail member 84 is in the open position.

Upon disengagement of the wing member 94 by the ear 92, that is, upon upward motion of the pivoting platen support 90 to its original position, the force exerted by the cantilevered member 98 causes the side rail member 84 to return to its original closed position.

Figure 8A:
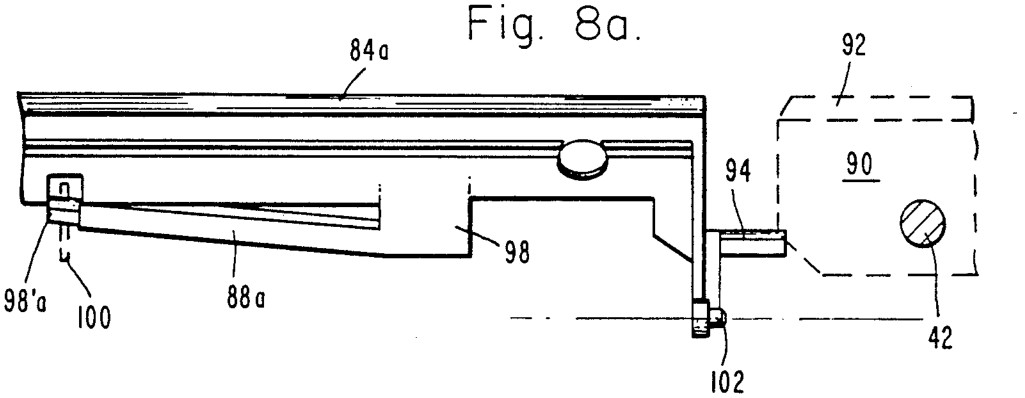
FIG. 8*a* is a partial side elevational view similar to that of FIG. 7, enlarged to illustrate the mechanism of motion.
Figure 8B:
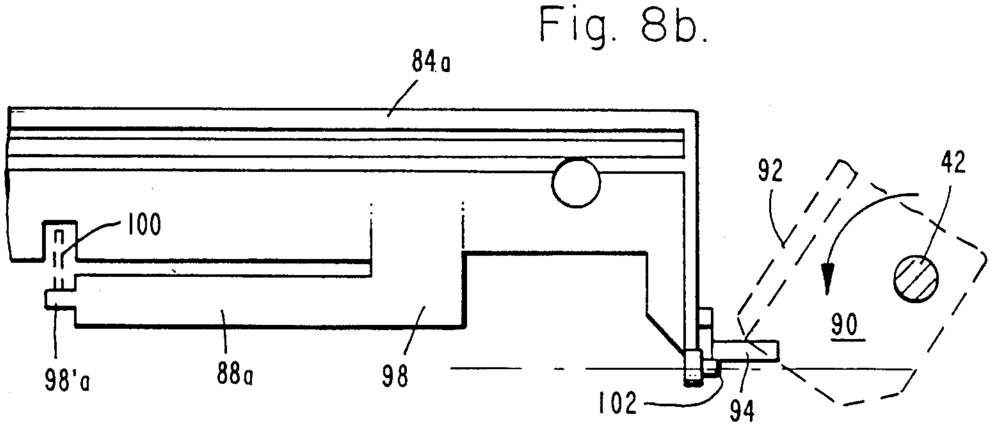
FIG. 8*b* is a view similar to that of FIG. 8*a*, further illustrating the mechanism of motion.

FIGS. 8*a,b* depict the mechanism of the motion, with FIG. 8*a* showing the platen support 90 in its original position and the side rail member 84 in its original, closed position, with the cantilevered member 98 in its preferred bowed state. FIG. 8*b* shows the platen support 90 having rotated downwardly about the paper drive shaft 42. Although not visible in FIGS. 8*a,b,* the ear member 92 engages the wing member 94, forcing the side rail member 84 outwardly. It will be observed that the cantilevered member 98 has deflected to a nearly straight configuration.

Of course, other means may be used to depress the wing members 94a,b where a rotating platen support (or rotating platen) is not employed. Typically, the printer will include means 322 (described below) for detecting the end, or bottom edge, of the sheet 16c. Various means of coupling such detection means to the wing members 94a,b could alternatively be employed.

The main advantages provided by the active paper drop mechanism are three-fold. First, the side rail members 84a,b keep the sheet 16c of print medium being printed on from touching the wet ink of a previously printed sheet 16b until the ink is dry. Second current sheet 16 is elevated by the use of side rail members 84a,b on the under side of the sheet. Therefore, nothing contacts the side being printed on, so that smearing of the wet ink is avoided by the active drop mechanism 82. Third, sheets 16c of the print medium drop into the output tray 18 regardless of the amount of stiffening due to cockling.

Paper Drive Roller

Figure 9:
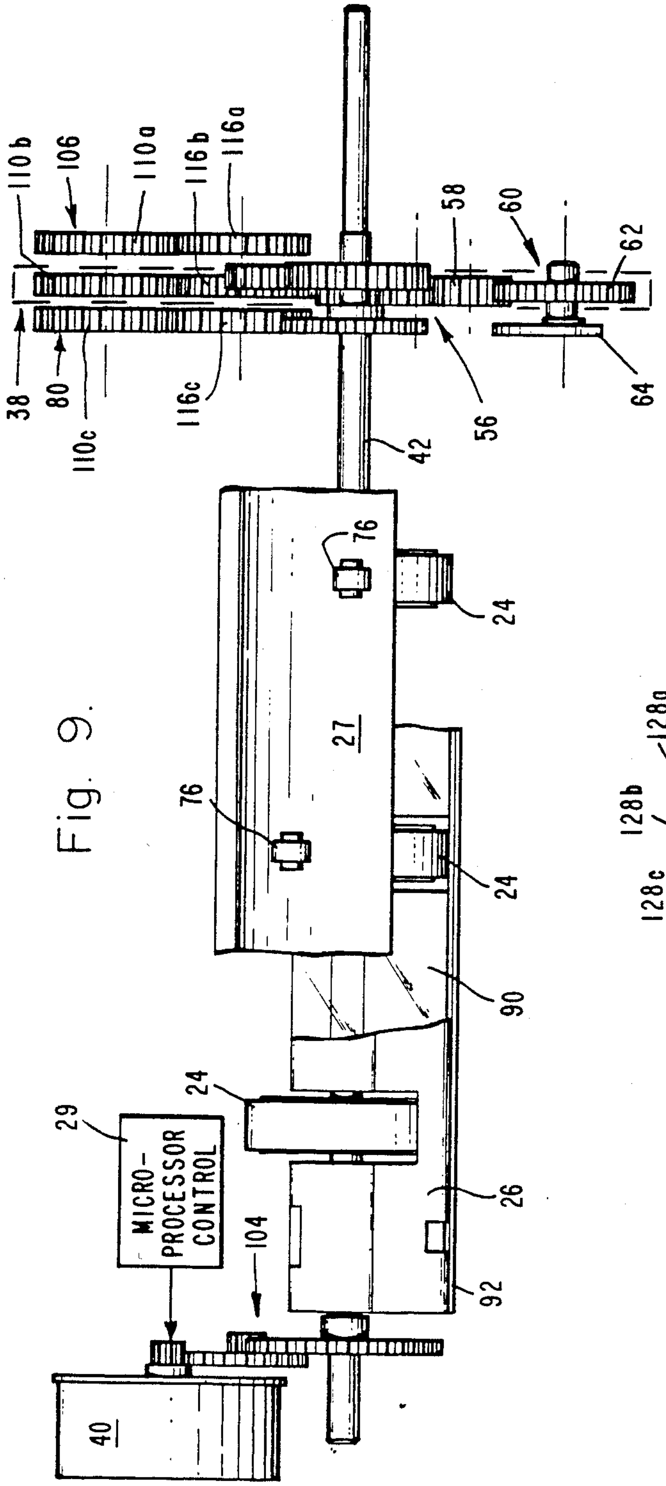
FIG. 9 is a front elevational view, partially broken away, of the paper drive train, including the paper drive motor, the paper drive roller, and the gear train used in the paper pick operation.

The paper drive roller is segmented, comprising a plurality of drive rollers 24 disposed along the paper drive shaft 42. The individual drive rollers 24 perform two functions: first, it is able to pick paper from the input stack 16a as well as drive paper around to the print zone at B, and second, it allows the platen 26 to pivot after printing a page, since the platen fits in between the drive roller segments, as shown in FIG. 9.

Advantageously, there are three drive rollers 24, one near each side of the medium 16, offset about ½ to ¾ inch to provide a buckle zone, and one in the center, thereby allowing the platen 26 to extend between the drive rollers 24 to provide the reverse bow at A. Also, the drive rollers 24 can be used to pick a sheet off the paper supply; a buckle zone is needed to pick such a sheet. This arrangement is to be compared to use of a solid paper drive roller customarily employed in the art.

The drive rollers 24 conveniently comprise a synthetic rubber material, suitable for driving paper.

Associated with each drive roller 24 is a first pinch wheel 72 for gripping a sheet of paper 16c picked from the stack of paper 16a. Also associated with each wheel 24 is a second pinch wheel 76.

The pinch wheels 72, 76 comprise a compliant foam rubber. The pinch wheels 72, 76 hold the sheet 16c against the paper drive rollers 24 as it traverses the nearly 180° around the drive roller. The middle pinch wheel of the second set 76 is placed behind the other two in order to hold the paper to the drive rollers in a region close to the out-of-paper sensor 322 (discussed below).

The paper drive train is shown in FIG. 9, comprising the paper drive motor 40 mechanically coupled to the paper drive shaft 42 by a gear train 104.

The downward pivoting of the platen 26 (shown in FIG. 3d) is controlled by an arm (not shown) on pivoting platen support 90 which contacts an offset pin (not shown) on a pivot gear (not shown). The pivot gear is coupled to the mechanical multiplexer 63 by the gear train 80.

Multiplexer

The multiplexer 63 employed herein interacts with three gear trains, the gear train 38 for picking a sheet of paper with the drive wheels, the gear train 80 for pivoting the platen 26, and a gear train 106 for operating a pump 108 for priming the printhead 33.

Figure 10:
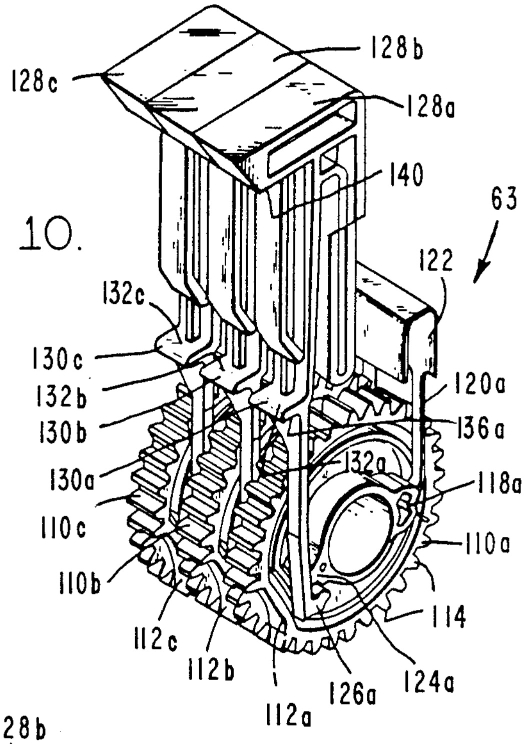
FIG. 10 is a perspective view of a portion of the mechanically actuated multiplexer used in the practice of the invention, including a plurality of multiplexer gears and triggers associated therewith.
Figure 11:
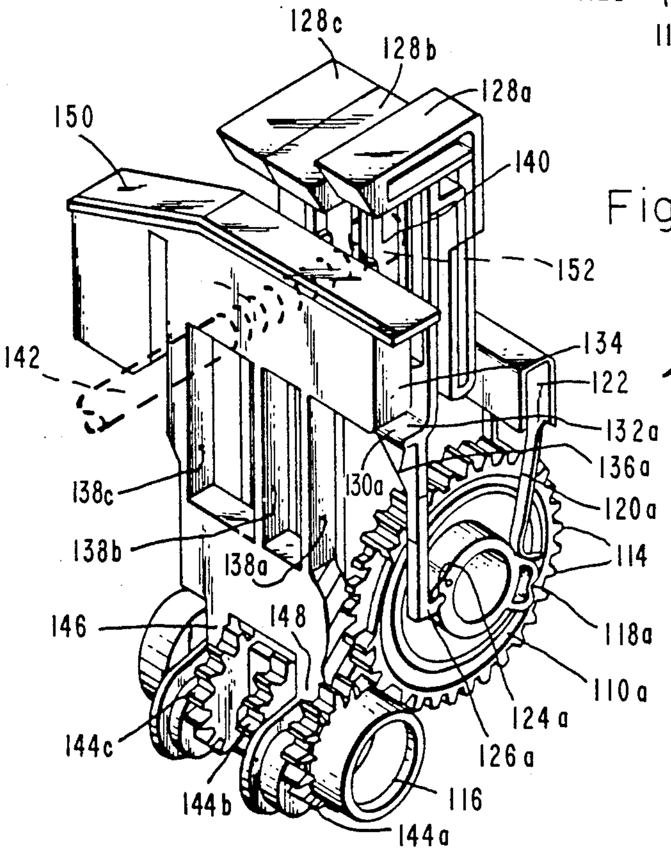
FIG. 11 is a perspective view of engagement of the multiplexer depicted in FIG. 10 with a follower mechanism for actuating the multiplexer gears of the multiplexer.

The following description of the multiplexer 63, shown in FIGS. 10 and 11, is directed to the associated parts that interact with one gear train. It will be appreciated that the associated parts that interact with the other gear trains are identical, and to the with identical numerals, extent visible, are labeled but different letters (e.g., 110a, 110b, 110c).

The multiplexer 63 has three multiplexer gears 110a–c. Each multiplexer gear 110 has a cutout 112 in the teeth 114 which prevents engagement with a multiplexer pinion gear 116. A detent detail 118 allows an arm 120 of a multiplexer spring 122 to hold the multiplexer gear 110 in place. A hook detail 124 on the multiplexer gear 110 mates with a hook portion 126 on a trigger 128, thereby allowing the trigger to rotate the multiplexer gear and meshing the multiplexer gear with the multiplexer pinion gear 116.

Three triggers 128a–c each have a hook portion 126 which mates to the hook detail 124 of the corresponding multiplexer gear 110. The trigger 128 has a lower ledge 130, the upper surface 132 of which allows a follower 134 to push the trigger into a down position, and the lower surface 136 of which allows the follower, via open portion 138, to slightly lift the trigger, which rotates the multiplexer gear 110 such that the cutout 112 and detent 118 are properly positioned. The trigger 128 also has an upper ledge 140 which is used by an interposer arm 142 to lift the trigger and start rotation of the multiplexer gear 110.

The multiplexer spring 122 is provided with three arms 120, which are engaged in the corresponding detents 118 in the multiplexer gears 110a–c.

The multiplexer pinion gear 116 comprises three gear segments 144 to mate with the corresponding multiplexer gear 110. Associated on the same axis as the multiplexer pinion gear segments 144 are two offset cam pins (not shown) which support the follower 134. The multiplexer pinion gear 116 is coupled to the paper drive motor 40 through the paper drive shaft 42.

The follower 134 comprises two support arms 146, 148 which rest on the offset cam pins of the multiplexer pinion gear 116. The follower 134 is also provided with a guide ledge 150 for supporting the interposer arm 142. Finally, the follower 134 has three sets of ledges to mate with the top and bottom surfaces 132, 136 of the lower ledge 130 of the trigger 128.

Figure 12:
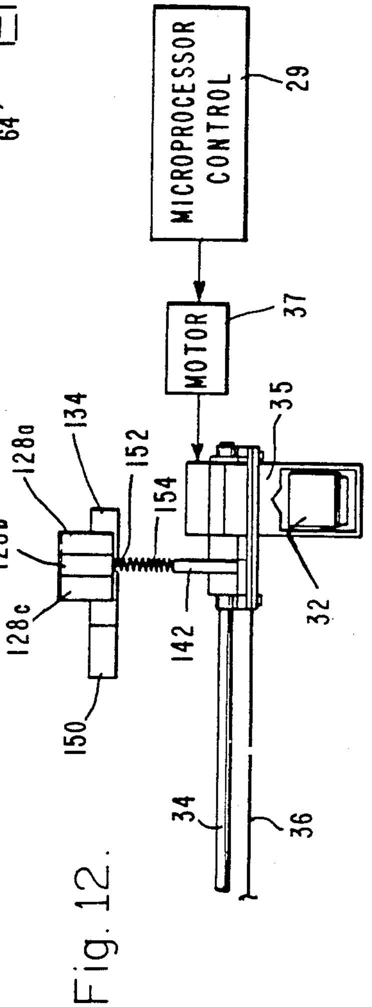
FIG. 12 is a top plan view of portion of the assembly for actuating the multiplexer gears, including an interposer, arm mounted on the printhead carriage.
Figure 18B:
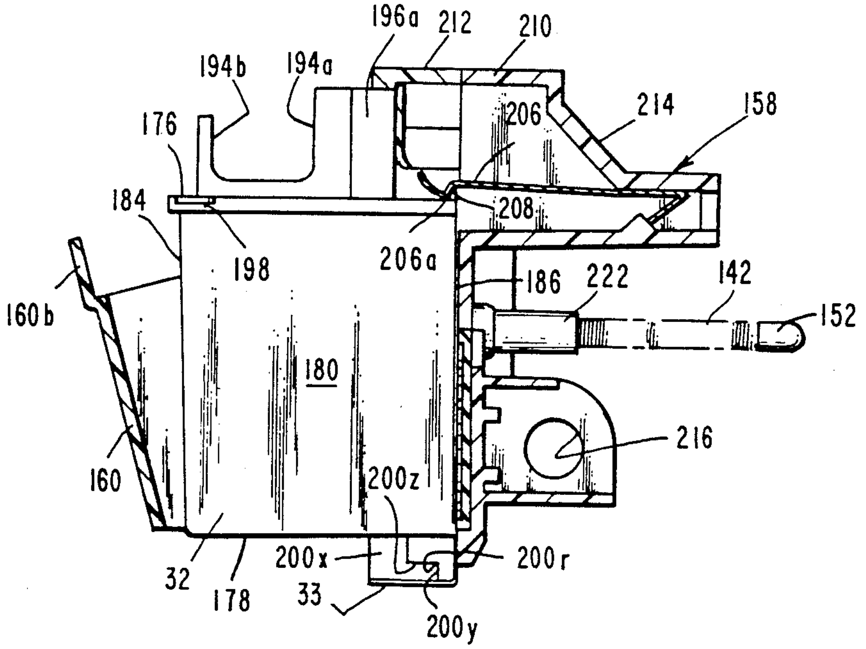
FIG. 18*b* is a view similar to that of FIG. 18*a*, but showing the cartridge locked into position.
Figure 18A:
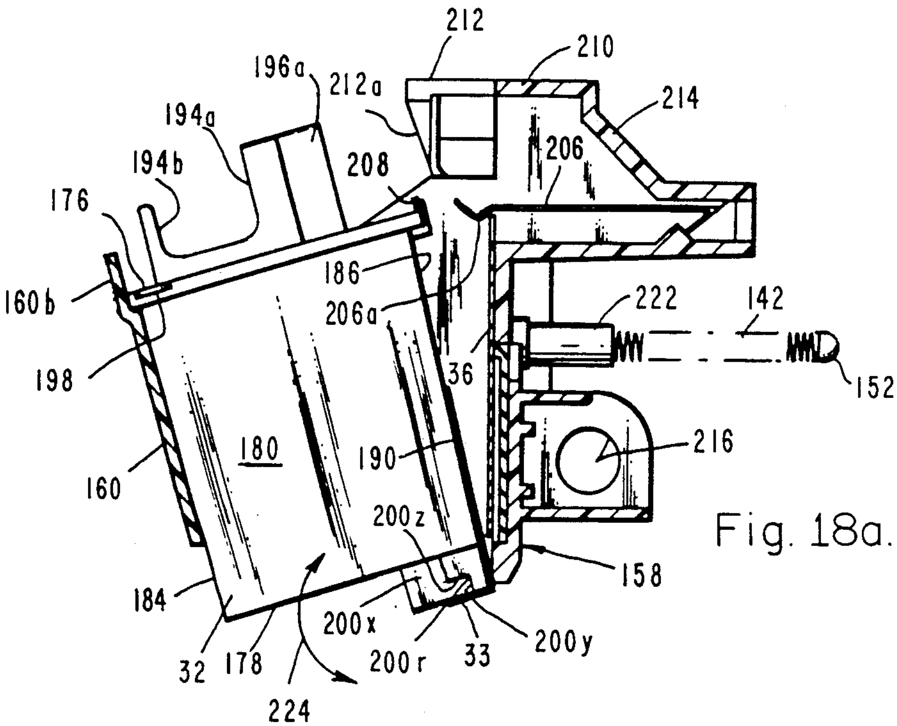
FIG. 18*a* is a cross-sectional view of the assembly depicted in FIG. 17, showing the cartridge inserted into the carriage, but not locked into place.

The interposer arm 142 is mounted on the carriage 35, as shown in FIGS. 12, 18a, 18b, and comprises an end effector 152, which transmits the motion of the follower 134 to one of the triggers 128 when the end effector is placed under the trigger, as shown in FIG. 11. The interposer arm 142 also includes a spring 154 to allow the end effector 152 to pass in front of the triggers 128a–c if the follower 134 is at the top of its motion.

In operation, the interposer arm 142 is placed under one of the triggers (here, 128a in FIG. 10; 128b in FIG. 12). Such placement is achieved by moving the carriage 35 to the appropriate position, under control by the microprocessor 29.

The trigger 128a is lifted, causing multiplexer gear 110a to rotate. The rotating multiplexer gear 110a meshes with the multiplexer pinion gear segment 144a.

The interposer arm 142 is removed (by moving the printhead carriage 35 laterally).

The multiplexer gear 110ia rotates for one revolution. During this tie, the follower 134 pulls the trigger 128a back into the "down" position. The cutout 112a on the multiplexer gear 110a causes the multiplexer pinion gear 116 to stop driving the multiplexer gear 110a. The follower 134 in the "up" position lifts the trigger 128a to position the multiplexer gear 110a in the detent position to complete the cycle.

As can be seen from the foregoing, any of three control features may be turned on mechanically, thereby eliminating the need for electronic control. The only electronic involvement is the proper placement of the carriage 35 by the microprocessor 29. Of course, more or less multiplexer gears 110 may be employed, depending upon the number of functions it is desired to control.

Figure 3A:
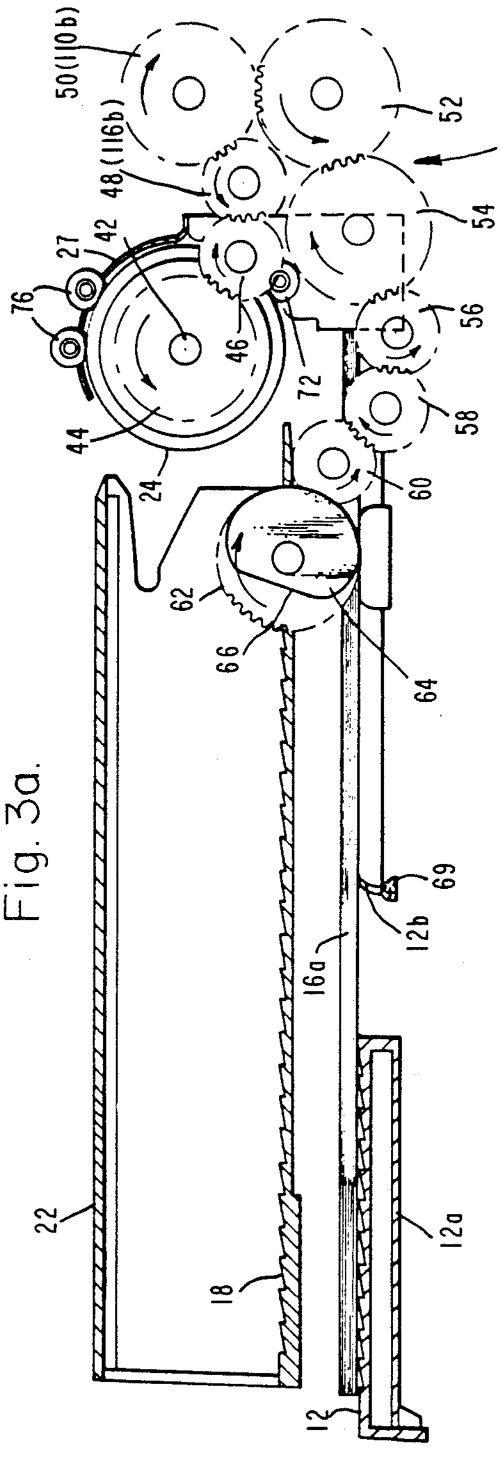
FIGS. 3*a–d*, in cross-section, depict the sequence of paper handling, from paper pick from the paper supply tray to paper deposit into the paper collection tray.
Figure 3B:
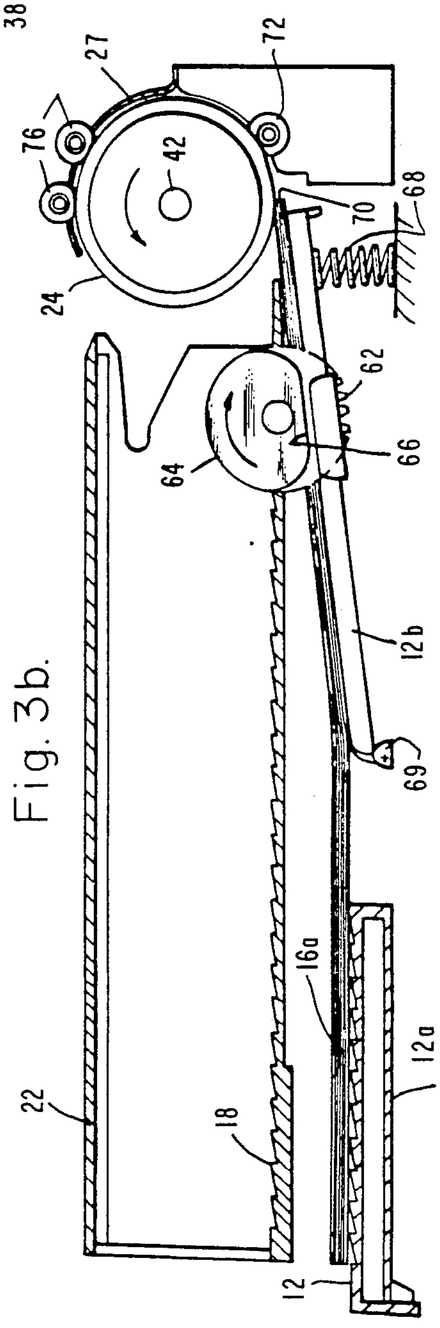
Figure 3C:
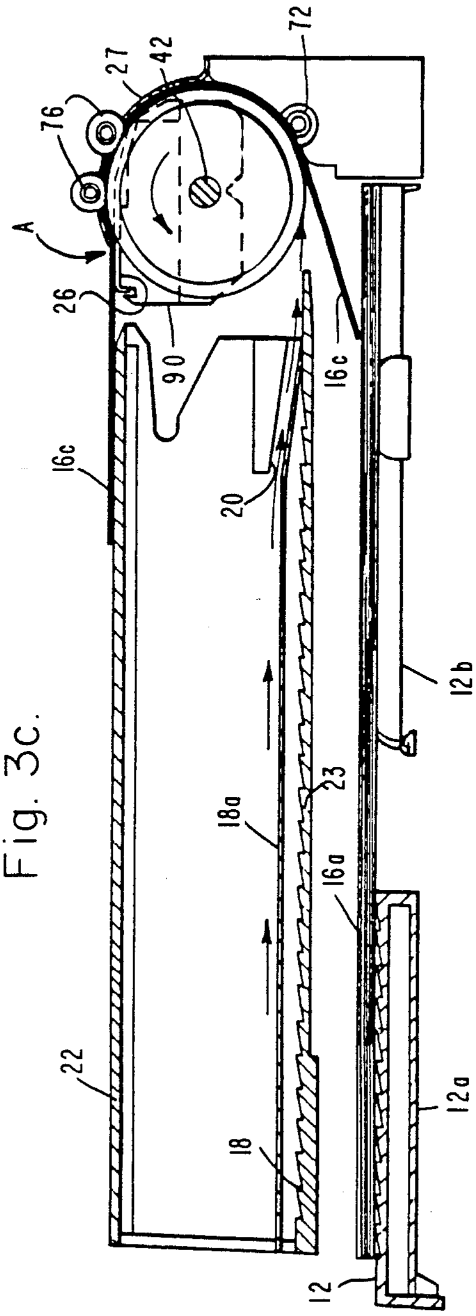
Figure 3D:
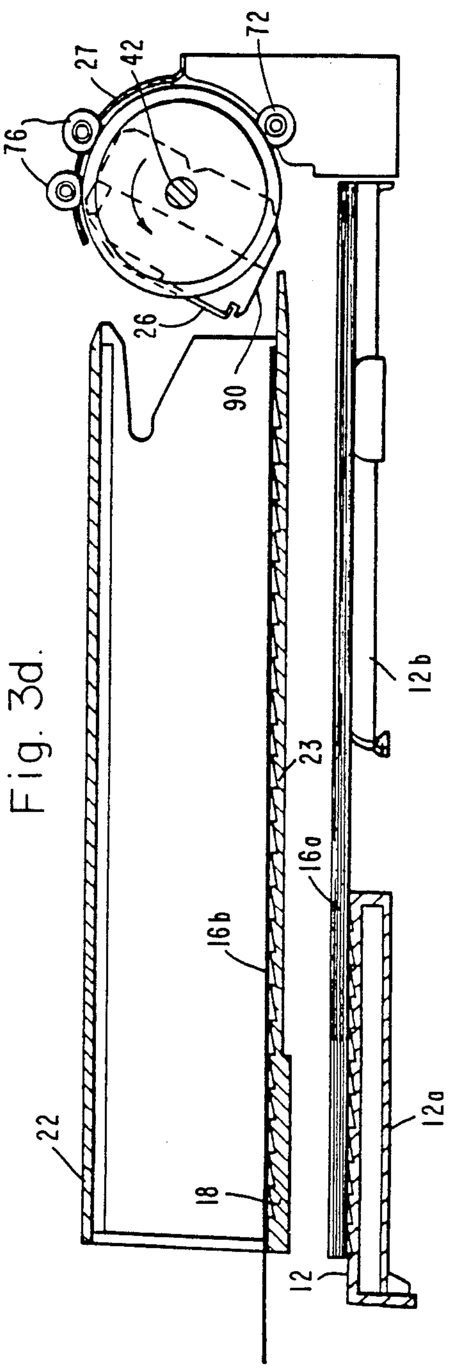

The relationship between the multiplexer 63 depicted in FIGS. 10 and 11 and the gear trains 38, 80, 106 is shown in FIG. 9. In FIG. 3a, the reference numerals in parentheses (110b and 116b) are indicated to show the relationship of the multiplexer gear 110 and multiplexer pinion gear 116 to the gear train 38.

Printhead Cartridge/Carriage Assembly

A print cartridge/carriage assembly, denoted generally at 156, is shown in FIG. 13. The assembly 156 comprises the carriage 35 and the print cartridge 32. As shown therein, the print cartridge 32 is depicted locked into position. The interconnect strip 36 provides electrical signals from the microprocessor 29 to the cartridge 32, as discussed more fully below.

As shown in FIG. 14, the carriage 35 comprises a base 158 and a chute 160 affixed thereto by fastening means 162. The carriage 35 advantageously comprises a glass-filled, carbon-filled, polytetrafluoroethylene-filled, silicon-filled polycarbonate.

The interconnect strip 36 and a spring pad 164 are sandwiched by the base 158 and chute 160. The spring pad 164 comprises a resilient, elastomeric material and, as seen in FIG. 15, comprises a plurality of resilient bumps 166. The spring pad 164 is seated in a depression 168 (shown in FIG. 16) in the carriage base 158, behind a portion of the interconnect strip 36, as described more fully below.

The base 158 and chute 160 are aligned in proper relationship by molded-in features such as alignment pins 170, which engage through corresponding openings in the interconnect strip 36 into opposed openings in the other member.

Figure 20:
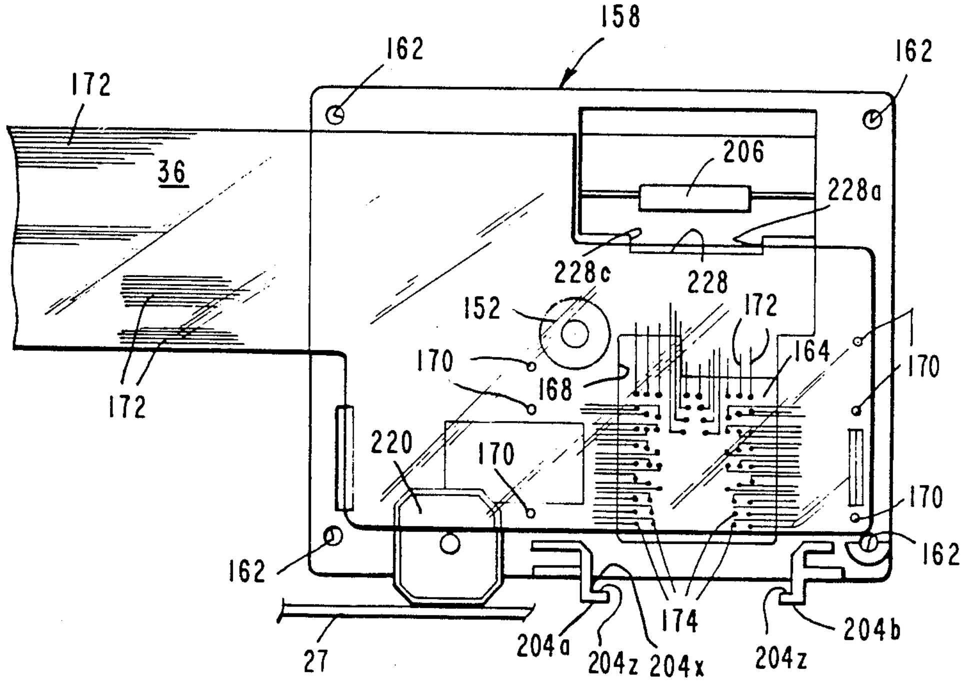
FIG. 20 is a side elevational view similar to that of FIG. 16, but with the cartridge chute removed in order to show the positioning of the electrical interconnect in the carriage.

The interconnect strip 36 comprises a strip of flexible dielectric material, carrying a plurality of electrically conducting lines 172, as seen more clearly in FIG. 20. The conducting lines 172 terminate in contact dimples 174, which are configured in a particular pattern.

Figure 19:
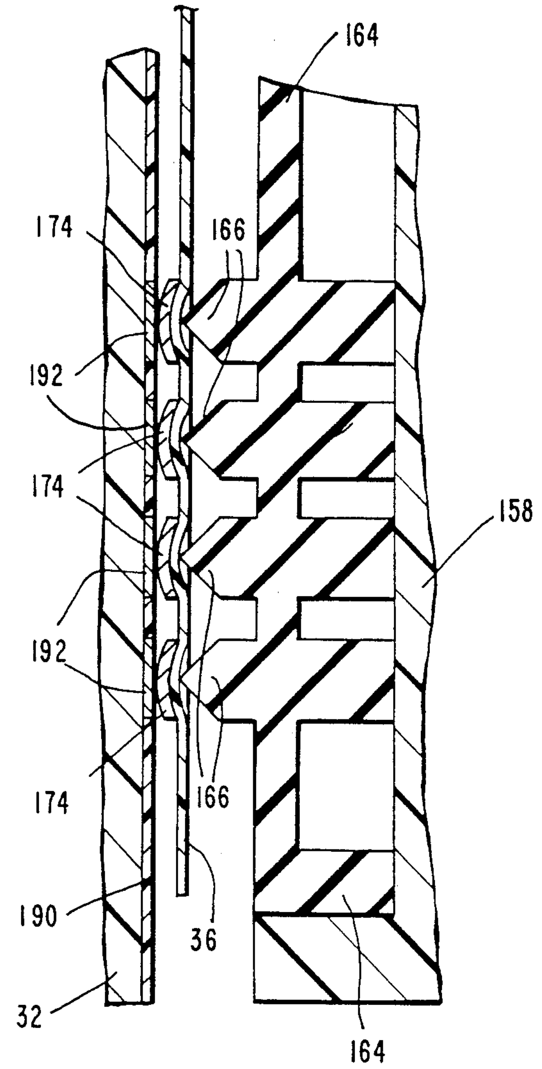
FIG 19 is a view similar to that of FIG. 18*b*, but showing a greatly enlarged view of the electrical interconnect and elastomeric support assembled in the carriage.

The bumps 166 on the spring pad 164 are configured in the same pattern as the contact dimples 174 on the interconnect strip 36. As seen in FIG. 19, the spring pad bumps 166 provide a force loading means against the contact dimples 174 to urge them against the cartridge 32.

The cartridge 32 comprises top 176, bottom 178, sides 180, 182, front 184 and back 186 surfaces. The cartridge 32 advantageously comprises a modified polyphenylene oxide.

The printhead 33 is provided on the cartridge bottom surface 178. The printhead 33 comprises a plurality of resistors (not shown) associated with a plurality of nozzles (not shown) formed in a nozzle plate (not shown). Ink (not shown) is stored in a reservoir within the cartridge 32.

The cartridge 32 also includes a contact strip 190 on the back surface 186, which wraps around to the bottom surface 178 to provide a plurality of conducting paths or traces to the printhead resistors. In particular, each resistor is supplied by an electrical signal along a unique conducting path. The contact strip 190 includes a plurality of contact pads 192, which are arranged in the same pattern as the contact dimples 174 on the interconnect strip 36. Locking of the cartridge 32 in the carriage 35, as described in greater detail below, matches up the contact dimples 174 with the contact pads 192, to provide an electrical path from the microprocessor 29 to each of the resistors in the printhead 33.

The contact strip 190 comprises a flexible material having a plurality of electrical traces thereon. Preferably, a tape automated bond (TAB) circuit of the type manufactured and sold by 3M Company (Minneapolis, Minn.) is employed.

The top surface 176 of the cartridge 32 is provided with a pair of finger grips **194*a*, 194*b*. The larger finger grip 194*a* terminates in a V-shaped surface 196*a*, which may be provided with an arrowhead insignia to denote the proper direction of orientation of the cartridge 32. When the cartridge 32 is locked in the carriage 35, the cartridge is received by a similarly shaped surface on the carriage to provide a visual reference for orientation. Lock-out ears 198 further act to prevent mis-orientation of the cartridge 32 in the carriage 35**.

Figure 21:
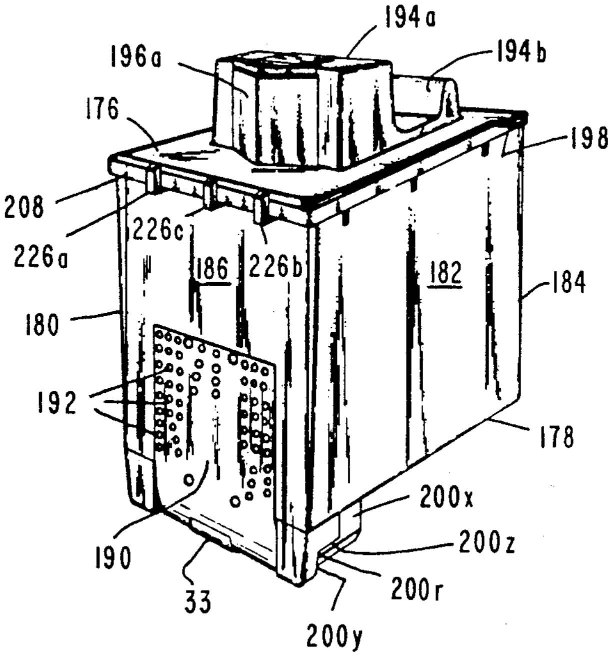
FIG. 21 is a perspective view of the cartridge, showing the printhead electrical contact, which provides electrical connection to the resistors in the printhead, and the reference pads.

Reference pads 200, seen more clearly in FIG. 21, are provided on the cartridge 32 near the base thereof. In particular, two sets of reference pads 200 are provided; these comprise sculpted surfaces that align the nozzle plate in the X, Y and Z directions. The X reference pad **200*x* is a surface parallel to the side surface 182. (There is only one X reference pad 200*x*, since the carriage 35 is provided with a side spring 202 which urges against the opposite side surface 180 to force the cartridge against reference pad 200*x*.) The Y reference pad comprises the back vertical surface 200*y* of the sculpted surface. The Z reference pad comprises the inner horizontal surface 200*z* of the sculpted surface. The junction of 200*y* and 200*z* comprises a pivot point 200*r*, about which the cartridge 32** rotates during the lock-in operation.

Two reference members **204*a* and 204*b* on the support base 158 each cooperatively engage one of the reference pads 200 in mating association. A snap spring 206 in the upper portion of the base 158 engages a rear ledge member 208 on the back surface 186 of the cartridge 32**.

The reference members **204*a,b* provide reference surfaces against which the reference pads 200 of the cartridge bear. In particular, reference pad 200*x* bears against reference surface 204*x* on member 204*b* (the member on the opposite side of the side spring 202). Reference pads 200*y* push back against reference surfaces 204*y* (shown in FIG. 14). Reference pads 200*z* bear down on reference surfaces 204*z***.

The snap spring 206 is housed in a molded-in feature 210 of the carriage base 158. A mating feature 212 of the chute 160, which sits above the snap spring 206 when the base 158 and chute 160 are assembled, includes an inward V-shaped surface **212*a*, which receives the similarly-shaped surface 196*a* of the cartridge 32. The rear of the molded-in feature 210 comprises a finger grip 214. The front of the chute 160 is also provided with a finger grip 160*b***.

The base 158 of the carriage 35 includes a bearing 216, which is associated with the carriage rod 34. The carriage rod 34 is positioned substantially parallel with the paper drive shaft 42, and permits bi-directional movement of the carriage 35 therealong. The carriage 35 is moved by a belt (not shown), attached to the carriage by a belt attachment 218. The belt is attached to the carriage drive motor 37, which is controlled by the microprocessor 29.

A reference means, or slider bump, 220 rides on the surface of the carriage guide 27. The weight of the carriage 35 preloads the slider bump 220 against the carriage guide 27, thereby making constant contact. The slider bump 220 comprises a low-friction, long wearing material and may be a separate piece or a molded-in feature of the carriage 35. The slider bump 220 serves to maintain the printhead 33 a constant, fixed distance from the print medium.

The carriage base 158 also includes the interposer arm 142 secured in a hollow tube 222. The function of the interposer arm 142 is related to mechanically triggering the multiplexer 63, as described above.

The printhead lock-in mechanism is considered unique, since it simultaneously aligns the nozzle plate in the X, Y, and Z directions and aligns, wipes, and loads the contact pads of the electrical interconnect 115 strip 36. This is accomplished with no additional bail, latch or lever arm, as seen on other ink-jet printers. The alignment of the nozzle plate and the loading of the interconnect strip 36 occurs when the user rotates the cartridge 32 in the direction of the arrow 224 (FIG. **18*a*), about the pivot point 200*r*. The user does this by squeezing the cartridge finger grip 194*a* and the carriage finger grip 214** between the thumb and forefinger.

Before the user can squeeze the cartridge 32 into its locked-in position, the user must be able to easily drop the cartridge into the carriage chute 160. The springs 202, 206 which align the cartridge 32 do not apply any force to the cartridge until the cartridge begins to rotate into the locked-in position (shown in FIG. **18*b*). This leaves an unobstructed path for the user to easily drop the cartridge 32 into the pre-rotation position, depicted in FIG. 18***a*. However, the side spring 202 applies light force when inserting the cartridge 32.

The cartridge 32 rotates about the pivot point 200*r*. As the user rotates the cartridge 32, the alignment functions are performed before the electrical interconnect strip 36 is loaded. First, one side 180 of the cartridge 32 engages the side spring 202. This spring 202 references the cartridge 32 in the X direction by pushing the cartridge sideways until the X reference pad 200*x* is touching the X reference pad 204*x* on the cartridge. The result is an accurate, no-slop alignment of the nozzle plate in the X direction.

The next action to occur is the alignment in the Z direction. As the rear ledge 208 of the cartridge 32 encounters the rear metal snap-spring 206, the spring pushes the cartridge in the Z direction until the Z reference pads 200*z* are in contact with the Z reference pads 204*z* on the carriage 35. The result is an accurate, no-slop registration of both the electrical interconnect strip 36 and the nozzle plate in the Z direction.

As the cartridge 32 continues to rotate about the pivot point 200*r* into position, the electrical interconnect contact pads 192 on the cartridge contact strip 190 get wiped slightly by the contact dimples 174 on the interconnect strip 36. This offers improved reliability over the dimpled interconnect on prior art printers, because the oxides and contamination are wiped off the contacts 174 and 192 before the interconnect strip 36 is loaded.

The wiping action is followed by the alignment of the cartridge electrical contact pads 192 in the X direction. This occurs when the cartridge's outer rear heel lock tabs 226*a,b* engage the sides 228*a,b* of the heel lock slot 228 on the carriage 35. The interconnect strip 36 on the carriage 35 is referenced accurately to the heel lock slot 228 by alignment pins 170, thereby providing the required alignment of the interconnect strip to the cartridge's electrical contact pads 174. The contact strip 190 is fastened to the cartridge 32 and is referenced by an assembly machine.

Finally, the cartridge 32 is aligned accurately in the Y direction. The electrical interconnect's spring pad 164 on the carriage 35 must be deflected the proper distance in the Y direction in order to maintain the required contact force. In the back 186 of the cartridge 32, the spring pad 164 pushes back against the electrical contacts 174 and 192 so that the Y reference pads 200*y* on the cartridge contact the Y reference pads 204*y* on the carriage. This maintains the necessary force on the contact pads 192 located on the contact strip 190 on the rear surface 186 of the cartridge 32. This also provides an accurate Y registration of the nozzle plate as well as controlling the rotational alignment of the nozzles.

In the front of the cartridge 32, the required contact force is maintained by the rear snap spring 206. As the cartridge 32 rotates into the locked-in position, the rear ledge 208 of the cartridge 32 deflects the rear snap spring 206 and passes over an over-center point 206*a* on the snap spring. The snap spring 206 is designed to apply about 70% of its force in the Y direction. This is the force required to maintain electrical contact to the interconnect strip 36 in the rear 186 of the cartridge 32.

As the cartridge 32 passes the over-center point 206*a* on the rear snap spring 206, the cartridge makes an audible "snap", signaling to the user that the cartridge is in the proper locked-in position. The force of the spring pad 164 is adequate to hold the cartridge into its accurately aligned position under the large accelerations and shock loads the cartridge encounters in normal printing operations.

To remove the cartridge 32 from the carriage 35, the user simply rotates the cartridge by squeezing the cartridge finger hold 194*b* and the carriage finger grip 160*b* between the thumb and forefinger. The rear ledge 208 on the cartridge 32 deflects the rear snap-spring 206 until the cartridge over-centers into the unlocked position. There is an audible "snap" which tells the user that the cartridge 32 can now be lifted out of the carriage 35 for disposal.

Service Station

Figure 22:
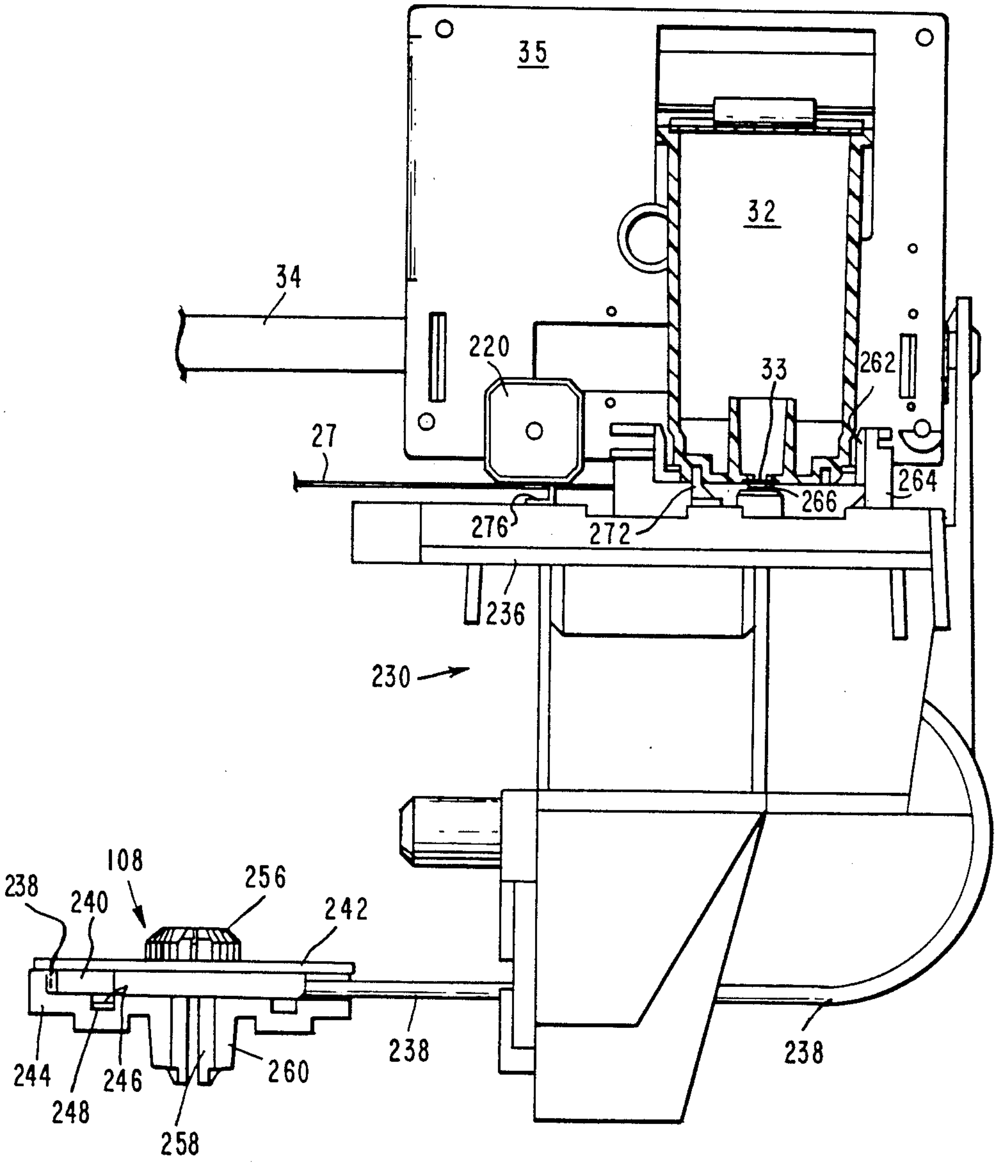
FIG. 22 is a front elevational view, partly in section, of an assembled service station employed in the ink-jet printer of the invention.

An assembled service station 230 is depicted in FIG. 22. The service station 230 comprises a peristaltic pump, denoted generally at 108, a sled 234, and a wiper bracket 236. The service station 230 is shown in position capping the printhead 33 of the cartridge 32.

The service station 230 provides a region at one end of the bi-directional movement of the carriage 35, which holds the cartridge 32 in locked alignment. The carriage 35 is moved bi-directionally along the carriage rod 34, typically by means of a belt (not shown), connected to the carriage motor 37. In the arrangement depicted in FIG. 22, the print medium 16*c* would be to the left of the service station 230, perpendicular to the plane of the drawing.

The peristaltic pump 108 comprises a tube 238, a roller 240, and a pump body 244. As seen more clearly in FIG. 23*a*, the peristaltic pump principle, which is conventional in the art, works by squeezing the tube 238 between the roller 240 and the pump body 244. Advantageously, the pump body 244 may be molded into the chassis of the printer 10. As used herein, the chassis constitutes the frame of the printer.

The roller 240 is provided with an axial hub 246, which rides in track 248 of the pump body 244.

The squeeze point of the pump 108 is moved along a portion of the length of the tube 238. In so doing, a pressure differential can be created to effect the priming operations on the printhead.

It will be noted that the pump 108 uses only one roller 240, rather than the conventional three rollers. Because the tube 238 is only squeezed by the roller 240 over 210° of motion, the pump allows the system to be vented without using an extra part, such as a solenoid venting valve tied into the tubing, as is commonly done in the prior art. This configuration allows the printhead 33 to vent to atmosphere as it caps (discussed in greater detail below), preventing a pressure rise as the cap collapses (see FIGS. 24*b*–*c*). Even a small pressure rise when capping is intolerable because it can force bubbles of air up into the printhead 33.

The use of one roller 240 also permits the tube 238 to relax between rolling. Consequently, the tube 238 will not get pulled into the pump 108 during operation thereof, and the tubing will not take a compression set.

As seen in FIG. 23*a*, one end of the tube 238 is attached to the bottom of a cap chamber 250. The other end of the tube 238 terminates in free space, positioned over an absorber pad (not shown). The absorber pad is used as a holding vessel while the ink evaporates into the air.

The vent to atmosphere is achieved by use of long tube 238 having a small inside diameter, about 0.030 to 0.060 inch ID. Because of the small inside diameter, diffusion is very slow, yielding an effective vapor seal while still allowing the cap chamber 250 to be vented to atmosphere. This unique aspect of the configuration may be difficult to easily achieve in any other way.

The roller 240 in the pump 108 employs circumferential ridges 252 which help to center the tube 238 in the area of highest pinching force. Consequently, the configuration is more tolerant of manufacturing variations.

The roller 240 is mounted in a roller carrier 242 and rotates once into position by activation of the multiplexer 63 by means of a bevel gear 254, which engages bevel gear 256 on the pump body.

The roller carrier 242 of the pump 108 is designed to allow a robot (or other automation) to assemble it. The robot can place the roller 240 and then snap the roller carrier 242 in place because it is assembled straight down from the top. There are no fasteners holding it in; molded-in snaps 258 trap everything in placeby engaging in a boss 260 molded into the chassis.

now to FIGS. 24*a–c*, as the printhead 33 moves toward the capped position (illustrated in FIG. 24*c*), a pen support 262 on the carriage 35 strikes an arm 264 on the sled 234 and aligns cap 266 on the sled so that it caps around the pen's orifices in the orifice plate. The orifice plate is part of the printhead 33 and, due to its small dimensions, is not easily visible in the scale of the drawing depicted herein.

As the pen support 262 strikes the arm 264, the sled 234 simultaneously rises up on ramps 268 and presses the cap 266 up against the perimeter of the orifice plate of the printhead 33, sealing the orifices from the atmosphere. Advantageously, the ramps 268 may be molded into a wall of the printer chassis. Bosses 270 support the sled 234 on the ramps 268.

As the sled 234 rises on its ramps 268, a pen catcher 272 engages a slot 274 in the printhead 33. When the cartridge 32 subsequently leaves the service station 230, the pen catcher 272 ensures that the sled 234 is returned to its inactive position, depicted in FIG. 24*b*.

The purpose of the ramped sled motion is to prevent wear on the cap 266 so that it will not need to be replaced during the life of the printer. The motion also allows movement of the cartridge 32 into position to activate the pump 108 through the multiplexer 63 and then move back out of the multiplexer while being capped the entire time. Thus, the sled configuration described herein impacts product reliability (through reduced cap wearout) and multiplexer design (through allowing motion while capped).

Once engaged by the multiplexer 63, motion of the carriage 35 is coupled by the gear train 106 (shown in FIG. 9) to the roller carrier 242 via bevel gear 254 and bevel gear 256.

Prior to capping, the printhead 33 moves across a wiper 276 secured in the wiper bracket 236. The wiper 276 comprises a blade, the edge of which scrapes paper dust and other contaminants off the orifice plate of the printhead 33. The wiper 276, which advantageously comprises a resilient material such as nitrile rubber, is cleaned by pocket edges (not shown) in the bottom of the printhead 33. These pocket edges are formed on either side of the printhead 33, by the metallic tab/tape assembly described above.

Figure 25A:
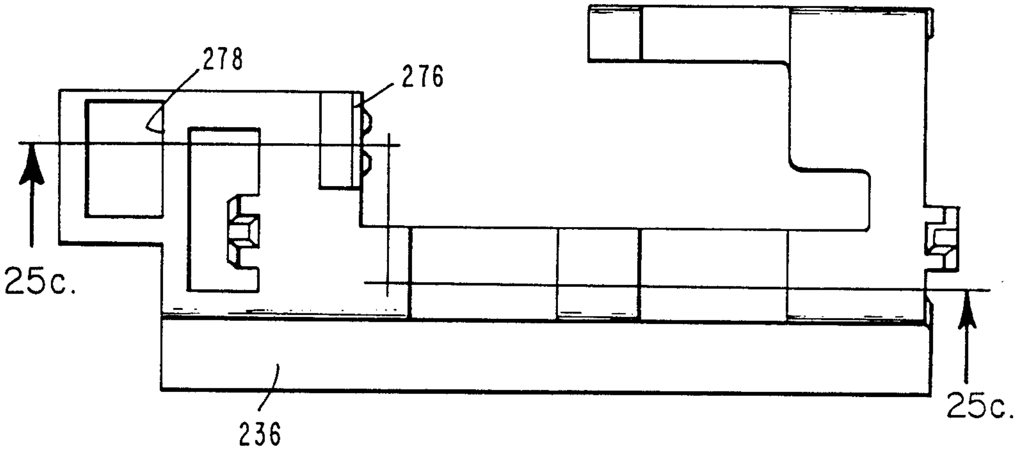
FIG. 25a is a top plan view of the wiper bracket of the service station assembly.
Figure 25B:
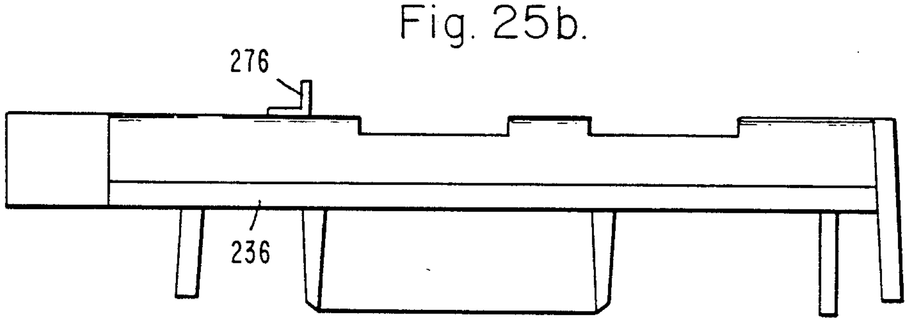
FIG. 25b is a front elevational view of the wiper bracket.
Figure 25C:
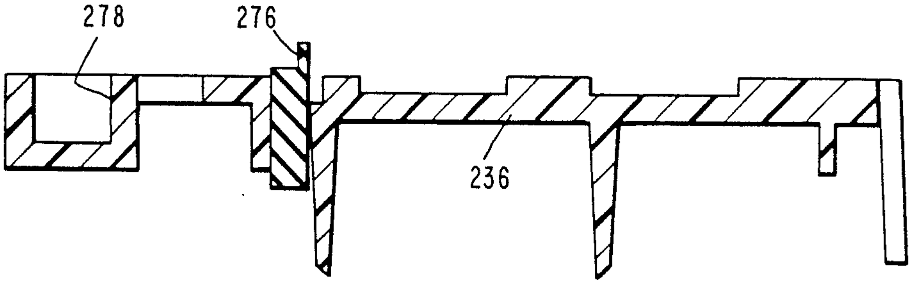

A control algorithm has been developed for the service station of the invention. On initial power-up, all nozzles are fired a number of times, e.g., 32 times, into the cap chamber 250. All nozzles are also fired a number of times, e.g., four times, into a spittoon 278, shown in FIG. 25*a*, which is part of the wiper bracket subassembly 236, each time the cartridge 32 leaves the service station 230 and a number of times, e.g., four times, into the cap chamber 250 each time the cap 266 is engaged. All nozzles in the printhead 33 are also fired a number of times, e.g., four times, into the spittoon 278 periodically, e.g., every 60 seconds, during printing.

These firings have two purposes. First, they are intended to clear any nozzle clogs which might develop before printing begins. This function is common to all ink-jet printers. Second, the droplets fired into the cap chamber 250 provide moisture to keep the printhead 33 from drying up during capping. This function is not believed to be used on other ink-jet printers, and clearly provides an advantage, in that the printhead 33 provides its own moisture for humidification of inactive, capped nozzles.

The flow rate of ink through the nozzles for clearing printhead problems, such as viscous ink plugs and bubbles, is optimally about 1 to 5 $cm^3$/min. A displacement of about 0.06 to 0.15 $cm^3$ of ink is optimal for clearing such problems in the printhead.

Referencing System

Figure 26:
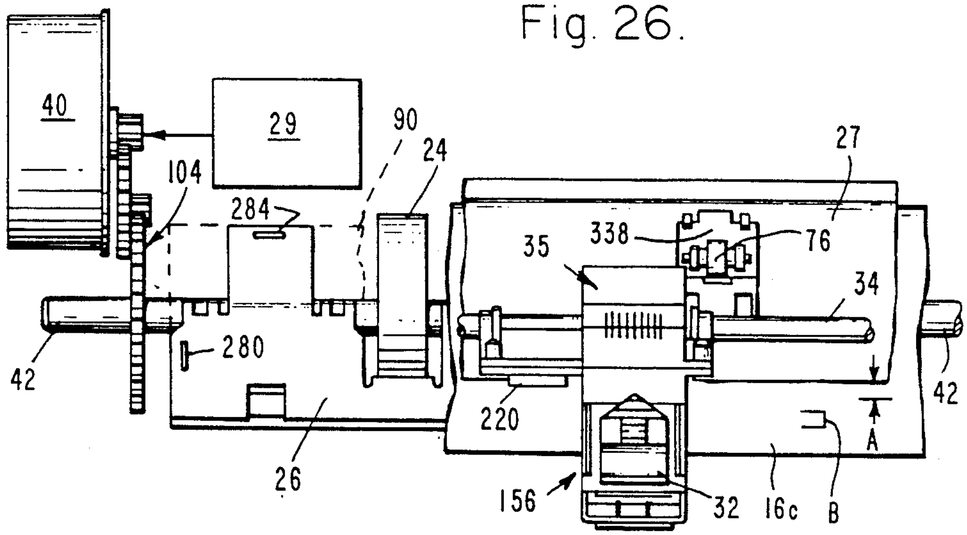
FIG. 26 is a top plan view, similar to that of FIG. 4, but omitting the gear trains and including the print cartridge associated with the platen.

FIG. 26, which is similar to FIG. 9, depicts a portion of the relevant parts of the printer involved in referencing of various parts to each other. The gear trains 38, 80, 106 have been omitted, and the cartridge/carriage assembly 156 is added.

Figure 27:
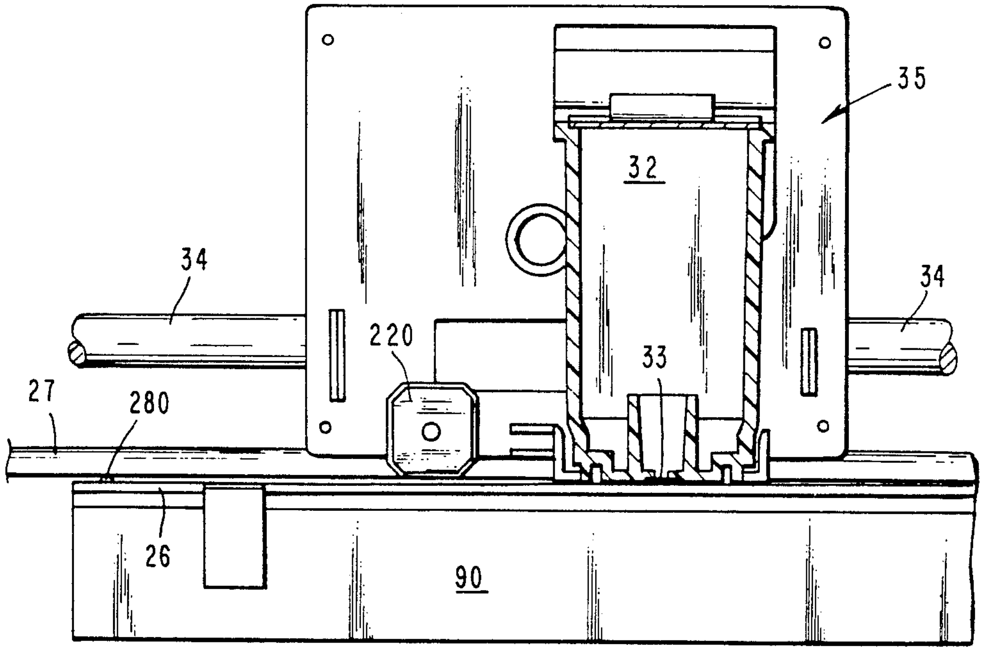
FIG. 27 is a front elevational view, partly in cross-section, showing the relationship of referencing the printhead, to the paper.

As seen in FIG. 27, the carriage 35 includes the slider bump 220, which rides on the surface of the carriage guide 27. The weight of the carriage 35 preloads the slider bump 220 against the carriage guide 27, thereby making constant contact. The slider bump 220 comprises a low friction, long wearing material and may be a separate piece or a molded-in feature of the carriage 35. The slider bump 220 could also be a mold- ed-in feature on the print cartridge 32, which is a disposable part. The slider bump 220 serves to maintain the printhead 33 a constant, fixed distance from the print medium 16*c*. The fixed distance may range from about 0.030 to 0.050 inch for a balance of optimum printing and minimum smearing resulting from cockling.

The platen 26 references to the bottom side of the front edge of the carriage guide 27 by platen bumps 280. The platen bumps 280 are provided on either side of the paper (see also FIG. 29), beyond the dimension of the widest paper to be accommodated in the printer, so as to avoid interference therewith. Platen springs 282 preload the platen bumps 280 against the carriage guide 27 (see FIG. 28). The platen bumps 280 provide a constant spacing between the platen 26 and the carriage guide 27. Spring loading serves to remove sensitivity to the tolerances from the platen 26 through the platen support 90, drive shaft 42, chassis (not shown), to the carriage guide 27.

The platen 26 is spring-loaded (by means of springs 282) to accommodate thick print media, such as envelopes. The platen bumps 280 are set to a height to allow thin media, such as paper, to slide through the resulting gap (thereby eliminating the drag force), and require thicker media, such as envelopes, to push the platen 26 down against the springs 282.

The height of the platen bumps 280 is chosen such that the gap between the platen 26 and the carriage guide 27 is between about 0.006 to 0.015 inch. Since the thicker media force the platen 26 down, the extra thickness is accommodated on the side opposite from the printed side, and the printed surface remains at a relatively fixed distance from the printhead 33. Thick media force the platen 26 down, which increases the drag force. However, the thicker media also increase the compression of the pinch wheels 72 and 76, which increases the driving force and more than compensates for the increased drag force.

The platen angle is maintained by using reference bumps 284 which reference to the platen support 90 associated with the platen 26. The reference bumps 284 are positioned sufficiently far away from the front edge of the carriage guide 27 to achieve a printhead-to paper angle (Angle $\theta_1$ in FIG. 29) of about 1° to 6° as discussed below.

The platen support 90 is capable of pivoting about the axis of the drive shaft 42, and controls downward pivoting of the platen 26 in connection with paper-handling activities, as described above. The downward pivoting is accomplished by contact of the platen support 90 to an offset pin (not shown) on a pivot gear (not shown). The pivot gear is coupled to the mechanical multiplexer 63 by means of the gear train 80 to cause the downward pivot of the platen 26.

The print cartridge 32 is referenced to the carriage 35, as discussed above, to ensure that the cartridge is locked-in identically the same position in the carriage each time.

The carriage 35 mounts on the carriage rod 34 and is referenced to the carriage guide 27 through the slider bump 220 on the carriage, discussed above.

In order to maintain sufficiently consistent spacing and angle, the carriage rod 34 and front edge of the carriage guide 27 must be parallel. These two parts must also maintain proper relative orientation.

To accomplish this, one side (here, the left side) of each part (carriage rod 34 and carriage guide 27) is referenced to molded-in features (not shown) on the printer chassis and the right side on the right wall. As used herein, the printer chassis and right wall constitute the frame of the printer.

Keeping the end of each part referenced to the same part provides parallelism and orientation due to solid mounts between the carriage rod 34 and carriage guide 27.

Figure 28:
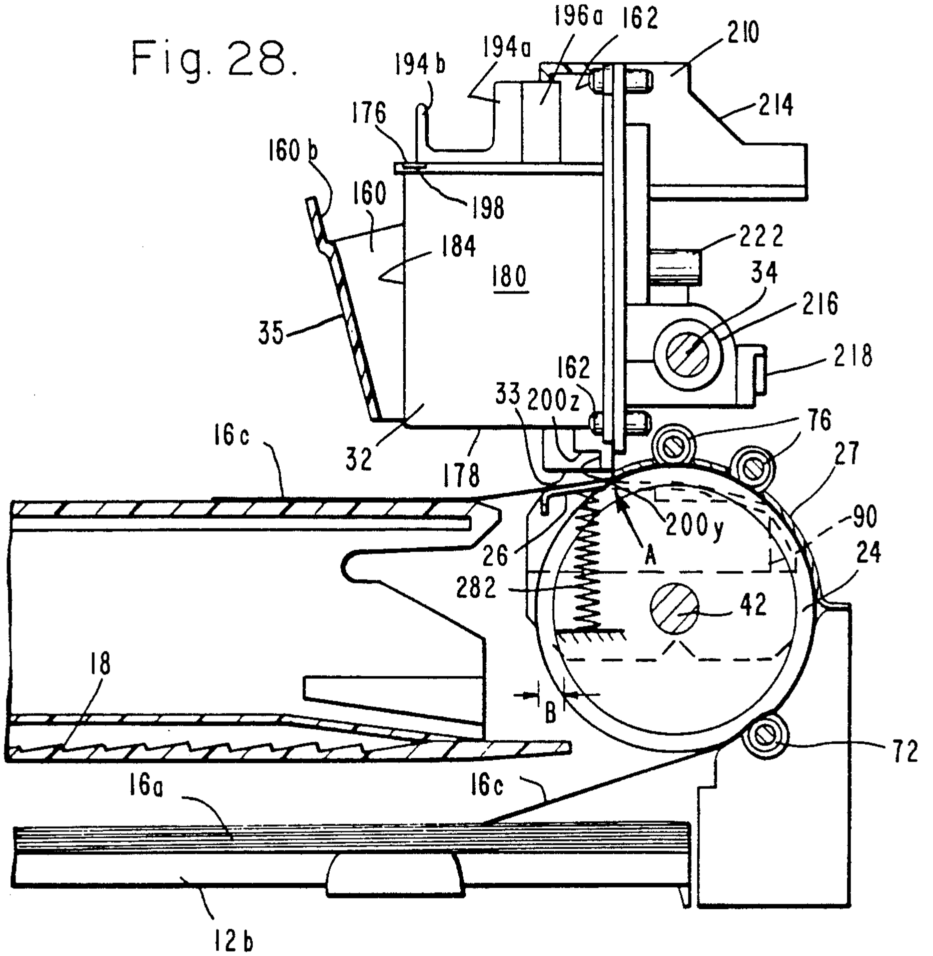
FIG. 28 is a side elevational view, similar to that of a portion of FIG. 3c, showing passage of the sheet of print medium between the carriage guide and the platen and association of the print cartridge therewith.
Figure 29:
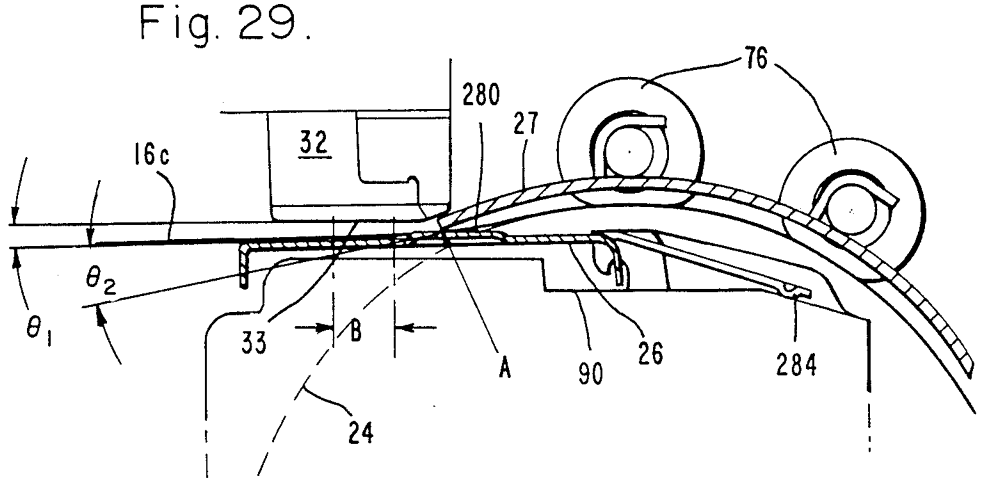
FIG. 29 is a cross-sectional view of a portion of the carriage guide shown in FIG. 28, showing the relationship of the various referencing parts to each other.

FIG. 28 shows one configuration in which the sheet 16*c* of paper is fed around the drive shaft 42 by the drive rollers 24, beneath the carriage guide 27 and onto the platen 26. The transition from the guide 27 to the platen 26 results in the reverse bow of the sheet 16*c* at point A (just behind the print zone B). The carriage guide 27 forces the sheet 16*c* into a bow rather than a straight line from the drive rollers 24 to the platen 26 (as seen in FIG. 29). This change in direction is caused by positioning the drive roller 24, platen 26, and carriage guide 27 such that the angle of the paper 16*c* as it leaves the drive roller 24 is different than the angle of the platen 26. The front edge of the carriage guide 27 is positioned such that it forces the sheet 16*c* into a bow. This change in angle (Angle $\theta_2$ in FIG. 29) should be between about 5° and 45°.

In FIG. 29, the printhead-to-paper angle is depicted. As can be seen, the sheet 16*c* travels at an angle $\theta_1$ to the printhead 33. For optimum results, the paper 16*c* makes a positive angle of from about 1° to 6°. This positive angle is sufficient to prevent smearing of wet ink by any portion of the printhead 33 as a consequence of cockling of the paper. Paper cockling is due to paper expansion from the absorption of the wet ink, and causes the sheet 16*c* to lift and move toward the printhead 33. Angling the sheet 16*c* downward from the printhead 33 provides clearance for the cockling effect.

The angle ($\theta_1$) of the sheet 16*c* with respect to the printhead 33 is achieved by angling the paper downward and the printhead upward. The angle of the sheet 16*c* is controlled by maintaining the angle of the platen 26, as described above. The angle of the printhead 33 is controlled by the height of the slider bump 220. A taller slider bump 220 will rotate the carriage 35 clockwise as seen in FIG. 28, thereby increasing the printhead angle.

Providing the reverse bow (at A), referencing the print medium 16*c* and the carriage 35 to the same part (the carriage guide 27), and providing spring-loading to the platen 26 and reference bumps 280 to maintain a minimum fixed spacing from the carriage guide, permits achieving substantially consistent printhead-to-paper spacing from one sheet of print medium to the next, regardless of media thickness or part tolerances.

These techniques also permit printing at the top of the page, the use of lower paper drive forces, and paper handling, without contacting the printed surface or reducing the print zone to provide such a contact area.

Other Features

An out-of-paper sensor 322 detects when the bottom edge of the sheet 16*c* being printed on passes a certain point. At that time, a signal is sent to the microprocessor 29 to indicate the out-of-paper condition.

Figure 30:
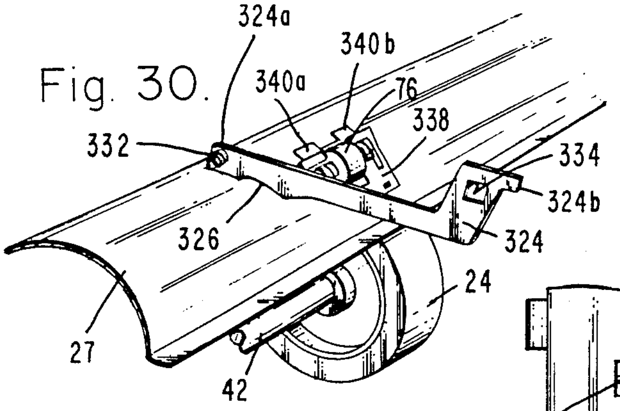
FIG. 30 is a perspective view of an out-of-paper sensor.
Figure 31:
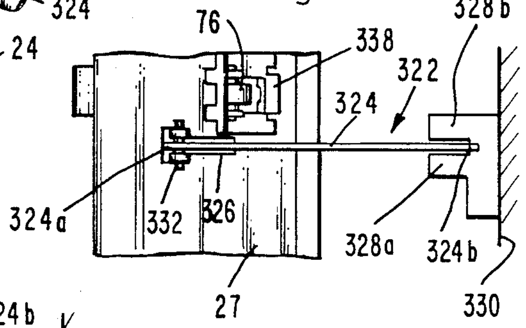
FIG. 31 is a top plan view of the out-of-paper sensor.

The out-of-paper sensor 322, depicted in FIGS. 30 and 31, comprises a flag 324, one end 324*a* of which is slidably engaged in a slot or groove 326 in the carriage guide 27. The other end 324*b* of the flag 324 is operatively associated with a sensing means 328 on printed circuit board 330, which contains the electronics controlling the printer 10. The flag 324 is pivotally mounted at end 324*a* on pivot 332 and includes a downwardly-depending portion 324*c* adapted to move in and out of engagement with the groove 326.

Preferably, the sensing means 328 comprises an optoelectronic light source 328*a* and detector 328*b*, separated by a distance to accommodate the thickness of the end 324*b* of the flag 324. The upraised portion of the end 324*b* of the flag 324 is provided with an opening 334.

Figure 32A:
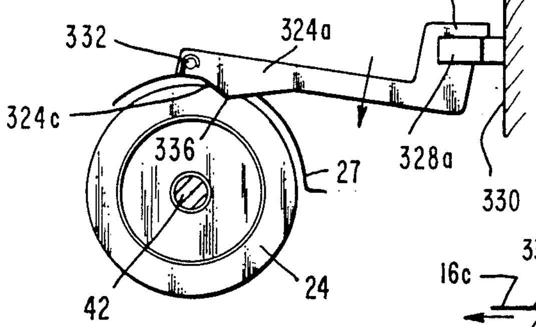
FIG. 32a is a side elevational view of the out-of-paper sensor in the down (out-of-paper) position.
Figure 32B:
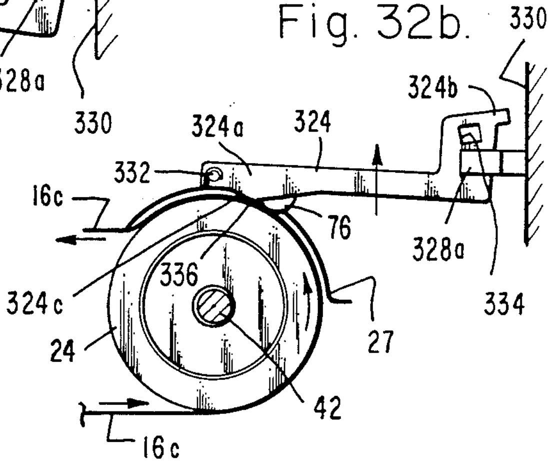
FIG. 32b is a view similar to that of FIG. 39a, but showing the out-of-paper sensor in the u (paper being printed) position.

As shown in FIG. 32*b*, the opening 334 of the flag 324 is normally held out of the path of the light/detector assembly 328 by the sheet 16*c* during printing thereof, thereby blocking the light path between the source 328*a* and the detector 328*b*. However, as the trailing edge of the sheet 16*c* passes trip point 336, the end 324*a* of the flag 324 falls into the groove 326. Simultaneously, the other end 324*b* of the flag 324 moves into the light path of the sensing means 328, thereby permitting the light beam to pass from the source 328*a* to the detector 328*b* through the opening 334, as shown in FIG. 32*a*. A software algorithm then allows printing to continue for an additional fixed number of lines, for example, 6 lines, in order to print closer to the bottom of the sheet.

Figure 33:
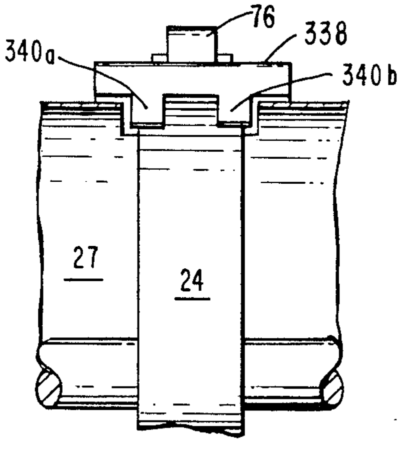
FIG. 33 is a front elevational view of a portion of the platen, showing a pinch roller and spring assembly in association with a roller.
Figure 34:
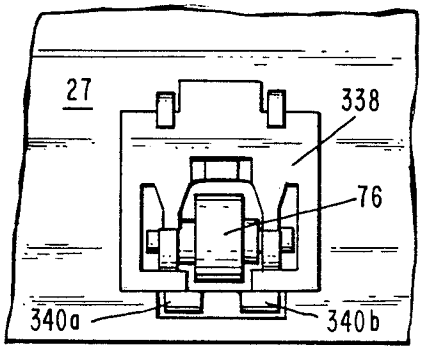
FIG. 34 is a top plan view of the pinch roller and spring assembly.

Pinch springs 338 associated with the pinch wheels 76 allow printing to the last possible position on the sheet 16*c*. The pinch springs 338 are bifurcated to provide two spring portions 340*a*, 340*b* on either side of the pinch rollers 76. The location of the spring portions 340*a*, 340*b* with respect to the pinch rollers 76 allows wear on the drive roller 24 to occur in a different location relative to the pinch rollers. Placing the spring portions 340*a*, 340*b* on either side of the pinch roller contact area thus allows the sheet 16*c* to be driven on an unworn surface, resulting in an improved linefeed over the life of the printer 10. One pinch spring/roller assembly is depicted in FIGS. 33 and 34; the former depicts the assembly as seen from the front, while the latter depicts the assembly as seen from above.

INDUSTRIAL APPLICABILITY

The novel single sheet ink-jet printer 10 of the invention is useful for a variety of printing applications.

Thus, an ink-jet printer having reduced cost and complexity, and combining the paper moving operation into one mechanism and providing for adequate drying of printed sheets, is provided. It will be clear to those skilled in the art that several changes and modifications of an obvious nature may be made without departing from the spirit of the invention, and all such changes and modifications are considered to fall within the scope of the invention as defined by the appended claims.

What is claimed is:

1. An ink-jet printer for printing on a print medium, comprising:

(a) supply means for providing a supply of print medium to be printed;

(b) collection means for collecting the printed medium;

(c) means for conveying the print medium from said supply means to said collection through a printing zone (B);

(d) a cartridge provided with a printhead and mounted on a carriage cooperatively associated with a carriage guide, for printing on the print medium;

(e) said cartridge being supported on a platen maintained in said printing zone;

(f) means for directing print medium in a plane generally parallel to said printing zone just prior to entering said printing zone, in order to maintain in substantial flatness of the print medium;

(g) means for permitting ink to dry on a previously printed sheet of said medium to dry during printing of a next sheet of said medium;

(h) a printhead carriage lock-in assembly for use with the cartridge having:

(i) carriage means;

(ii) said carriage means including base support means for receiving the cartridge;

(iii) said base support means depending into referencing means, for aligning the cartridge in proper printing position along at least two directions;

(iv) said base support means further including retention means for causing the cartridge to be locked in position relative to said carriage means;

(v) electrical interconnect means, for supplying control signals to the carriage; and (vi) the cartridge including a reference system corresponding to, and generally coordinating with, said referencing system of said base support means, for providing proper alignment to the cartridge during its positioning relative to said carriage means, and for causing the cartridge to be retained in position during the printing operation.

2. The printer as defined in claim 1, wherein said referencing means includes a pair of downwardly depending, spaced-apart, generally oppositely disposed L-shaped members, for engaging said reference system of the cartridge.

3. The printer as defined in claim 2, wherein the cartridge includes a rear ledge (64), and wherein said retention means includes spring means for engaging said rear ledge in order to retain the cartridge in a locked position.

4. The printer as defined in claim 3, wherein said carriage further includes chute means, secured to said base support means, for helping guide the cartridge in position.

5. The printer as defined in claim 4, wherein said chute means includes a spring means for applying a relatively light force against the cartridge, to help guide its alignment and positioning inside said chute means.

6. The printer as defined in claim 5, wherein said electrical interconnect means includes an interconnect strip, disposed intermediate said base support means and the cartridge, and terminating in a plurality of dimples disposed in a predetermined arrangement, for effecting electrical contact with the cartridge.

7. The printer as defined in claim 6, wherein said cartridge includes a contact strip having a plurality of electrically conducting pads disposed in a predetermined array for effecting electrical contact with said interconnect strip;

wherein the cartridge includes a plurality of resistors; and wherein said contact strip provides a plurality of conducting path to said resistors generally terminating in said conducting pads.

8. The printer as defined in claim 7, further inindlucing a spring pad means disposed intermediate said base support means and said interconnect strip, for forcing said interconnect strip against the cartridge, in order to maintain a good electrical interconnection therebetween.

9. The printer as defined in claim 8, wherein said spring pad means includes a plurality of externally protruding bumps; and wherein said bumps are disposed in a generally similar arrangement to that of said dimples and said conducting pads and in registration therewith, such that said bumps force said dimples against said conducting pads, in order to maintain a good electrical contact between said interconnect strip and the cartridge.

10. The printer as defined in claim 1, wherein the cartridge further includes a top portion, a bottom portion, and printhead means generally secured to said bottom portion;

wherein said reference system of the cartridge includes two sets of similar pads, generally disposed near said bottom portion in a substantially symmetrical relationship relative to said printhead means;

wherein said reference pads about one of said L-shaped members; and wherein said reference pads about the other L-shaped member.

11. The printer as defined in claim 1 wherein said conveying means comprises an active paper drop mechanism having a pair of opposed, spaced-apart side rail members associated with said paper collecting means, each side rail member cooperatively being associate with one side of said print medium and provided with:

(i) means for moving said side rail members from an initial sheet-supporting position to an open position wherein said sheet is no longer supported; and (ii) means for returning said side rail members to said initial position.

12. The printer as defined in claim 11 further including a service station to support the cartridge, wherein the cartridge includes a printhead having nozzles for diffusing ink, the service station including:

(i) means for wiping residues off of the printhead;

(ii) said wiping means being fixed at one end of travel of the carriage;

(iii) sled means connected to said wiping means for capping the printhead by surrounding the printhead nozzles;

(iv) said sled means being actuated by the carriage when the carriage moves to its end of travel position; and (v) pump means connected to said sled means for printing the printhead.

13. The printer as defined in claim 12 further including:

(i) first means for referencing the print medium to said platen;

(ii) second means, secured to the cartridge, for referencing the printhead to said carriage guide;

(iii) third means secured to said platen, for referencing said platen to said carriage guide; and (iv) wherein said first referencing means includes means for creating a reverse bow (B) in the print medium, and for causing the print medium to be directed atop said platen in a plane substantially parallel to the direction of printing.

* * * * *